US012769760B2

(12) United States Patent
Long et al.

(10) Patent No.: US 12,769,760 B2
(45) Date of Patent: Oct. 20, 2026

(54) VERIFYING CONSISTENCY OF REPLICATED DATASETS

(71) Applicant: Oracle International Corporation, Redwood Shores, CA (US)

(72) Inventors: Tony Long, Edmonds, WA (US); Calvin Alexander Loncaric, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/044,935

(22) Filed: Feb. 4, 2025

(65) Prior Publication Data

US 2026/0228236 A1 Aug. 6, 2026

(51) Int. Cl.
*G06F 16/27* (2019.01)

(52) U.S. Cl.
CPC .................................... *G06F 16/27* (2019.01)

(58) Field of Classification Search
None
See application file for complete search history.

(56) References Cited

U.S. PATENT DOCUMENTS

| | | | | |
|---|---|---|---|---|
| 7,028,054 | B2 | 4/2006 | Harper et al. | |
| 8,818,938 | B2 * | 8/2014 | Maya | G06F 16/27 707/610 |
| 11,921,748 | B1 * | 3/2024 | Hoffmann | G06F 16/2379 |
| 2003/0177122 | A1 * | 9/2003 | Makansi | G06F 16/273 |
| 2020/0004437 | A1 | 1/2020 | Borlick et al. | |
| 2020/0233881 | A1 | 7/2020 | Harduf et al. | |
| 2021/0279204 | A1 | 9/2021 | Grunwald et al. | |
| 2021/0279354 | A1 * | 9/2021 | Gandhi | G06F 11/3034 |
| 2021/0326359 | A1 * | 10/2021 | Upton | G06F 3/065 |

(Continued)

FOREIGN PATENT DOCUMENTS

| | | |
|---|---|---|
| CN | 116303500 A | 6/2023 |
| CN | 116414851 A | 7/2023 |

OTHER PUBLICATIONS

"Data Diff Monitors", Retrieved from https://docs.datafold.com/data-monitoring/monitors/data-diff-monitors, 4 Pages, (Date not available).

(Continued)

*Primary Examiner* — Kavita Stanley
*Assistant Examiner* — Cao D Vuong
(74) *Attorney, Agent, or Firm* — Invoke

(57) ABSTRACT

A system replicates source data from a source dataset stored in a source data repository to a destination dataset stored in a destination data repository. The system executes a sampling process that includes obtaining, from the source dataset, a source data sample corresponding to source data previously transmitted to a destination entity for replication of the source dataset. The system generates and transmits a control message to the destination entity that includes the source data sample. The destination entity receives the control message and executes a verification process that includes comparing the source data sample to the destination dataset to verify consistency between the source data sample and the destination dataset. The source dataset and the destination dataset are classified as consistent based at least in part on verifying consistency between the source data sample and the destination dataset.

20 Claims, 13 Drawing Sheets

(56) References Cited

U.S. PATENT DOCUMENTS

| | | | | |
|---|---|---|---|---|
| 2022/0156280 | A1* | 5/2022 | Nochlin | G06F 16/2255 |
| 2023/0350865 | A1* | 11/2023 | Ramabaja | G06F 16/273 |
| 2024/0111781 | A1* | 4/2024 | Sohn | G06F 16/23 |
| 2024/0184756 | A1 | 6/2024 | Kidokoro et al. | |
| 2024/0184801 | A1 | 6/2024 | Jamloki et al. | |
| 2024/0202182 | A1 | 6/2024 | Sui et al. | |

OTHER PUBLICATIONS

"Validating data consistency during an online migration", Retrieved from https://docs.aws.amazon.com/keyspaces/latest/devguide/migration-online-validation.html, Oct. 31, 2024, 4 Pages.

"What's a Data Diff?", Retrieved from https://docs.datafold.com/data-diff/what-is-data-diff, 2 Pages, (Date not available).

Grassie L., "Let's Talk About Stats: Methods for Comparing Two Sets of Data", Retrieved from https://bitesizebio.com/19298/comparing-two-sets-of-data/, Dec. 19, 2024, 11 Pages.

Yaddow W., "Planning Your Tests for Change Data Capture (CDC)", Retrieved from https://medium.com/@wyaddow/planning-your-tests-for-change-data-capture-cdc-e80c462330e1, Mar. 29, 2024, 16 Pages.

* cited by examiner

VERIFYING CONSISTENCY OF REPLICATED DATASETS

TECHNICAL FIELD

The present disclosure relates to replication of datasets. More particularly, the present disclosure relates to verifying consistency of replicated datasets.

BACKGROUND

When data is replicated from a source dataset to a destination dataset, it is possible for a discrepancy between the destination dataset and the source dataset to arise from various causes, such as data drift, unexpected system behavior, programming bugs, or power disruptions. Existing systems detect discrepancies by periodically performing a full data scan to compare the destination dataset to a source dataset. However, a full data scan is burdensome because it requires interrupting system operations and because it is resource intensive, especially for large datasets.

BRIEF DESCRIPTION OF THE DRAWINGS

The embodiments are illustrated by way of example and not by way of limitation in the figures of the accompanying drawings. References to “an” or “one” embodiment in this disclosure are not necessarily to the same embodiment and refer to at least one embodiment. In the drawings.

DETAILED DESCRIPTION

Figure 1:
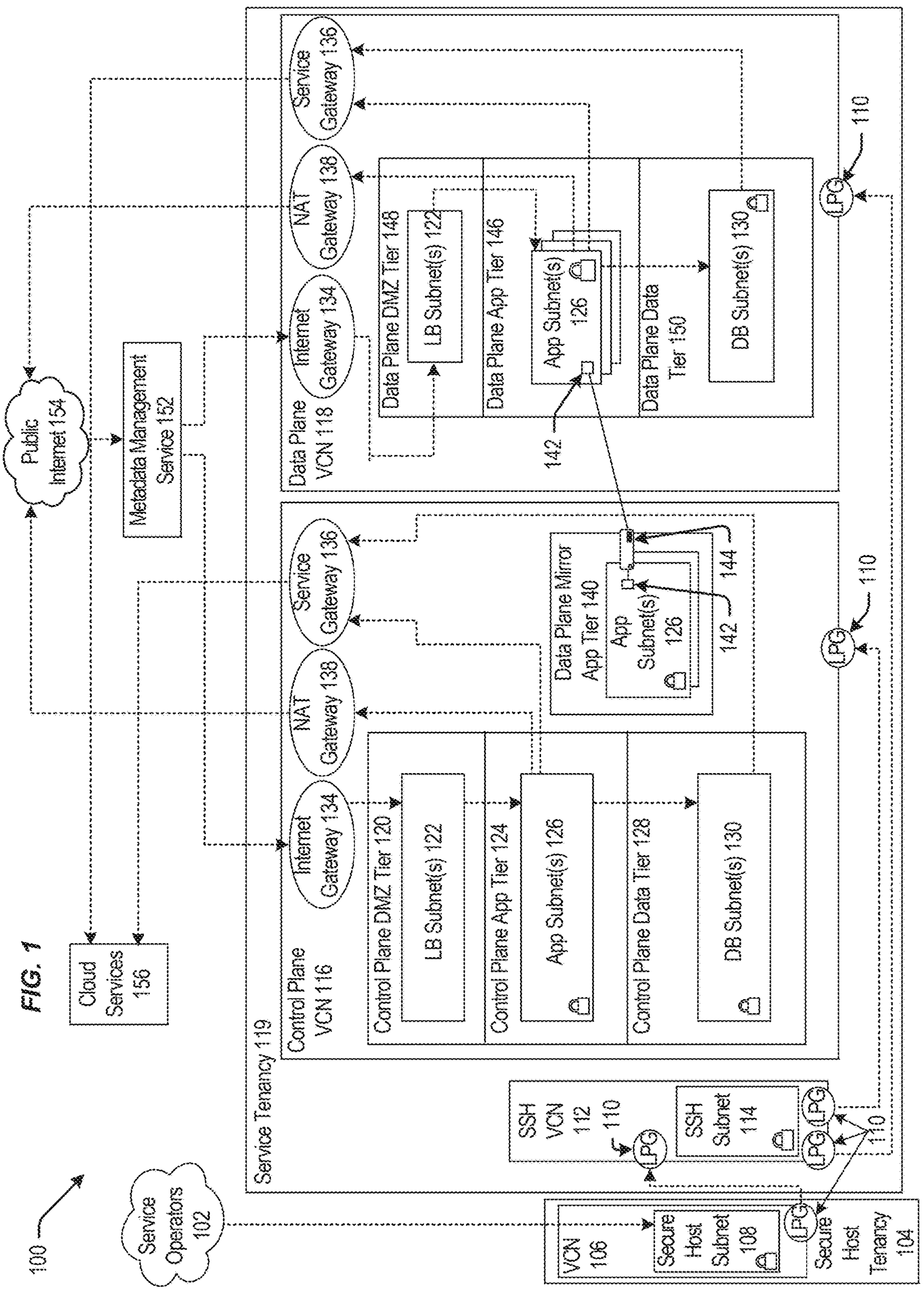
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CLOUD COMPUTING TECHNOLOGY
3. COMPUTER SYSTEM

4. SYSTEM ARCHITECTURE FOR EXECUTING OPERATIONS PERTAINING TO REPLICATING DATA AND VERIFYING CONSISTENCY BETWEEN DATASETS
5. EXAMPLE OPERATIONS PERTAINING TO REPLICATING DATA AND VERIFYING CONSISTENCY BETWEEN DATASETS
6. EXAMPLE MACHINE LEARNING SYSTEM
7. MISCELLANEOUS; EXTENSIONS

1. General Overview

One or more embodiments verify consistency between a source dataset and a destination dataset based on a sampling process that is integrated within a replication process for replicating data from the source dataset to the destination dataset. A system executes a replication process for replicating data from a source dataset to a destination dataset, and in connection with the replication process, the system executes a sampling process to sample a subset of data from the source dataset and/or the destination dataset. The system generates control messages that include data samples for verifying consistency between the source dataset and the destination dataset. The control messages are transmitted between a source entity and a destination entity utilizing a replication channel established for replicating data from the source entity and the destination entity. The system utilizes a sampling protocol that has a sampling rate that gives statistical assurance to a specified confidence level that the sampling protocol will detect a data drift of a specified magnitude.

Upon receiving a source data sample at a destination entity via a control message from a source entity, the destination entity verifies consistency between the source dataset and the destination dataset by comparing the source data sample to the destination dataset. The destination entity reports the results of the comparison by transmitting a control message to the source entity via an upstream communication channel. Additionally, or alternatively, upon receiving a destination data sample at a source entity via a control message from a destination entity, the source entity verifies consistency between the destination dataset and the source dataset by comparing the destination data sample to the source dataset. The source entity reports the results of the comparison by transmitting a control message to the destination entity via the replication channel. The system classifies the source dataset and the destination dataset as consistent based at least in part on successfully verifying consistency between the source data sample and the destination dataset. Additionally, or alternatively, in the event of an inconsistency between the source dataset and the destination dataset, the system executes one or more remediation operations to remediate the inconsistency.

In an embodiment, the system obtains sample data as and/or in response to control events associated with a replication service. The replication service may obtain sample data from one or more source datasets in response to control events that are triggered in accordance with a sampling protocol. The sample data is transmitted to replication destinations via the replication service utilizing a same streaming channel utilized for replicating data to the replication destinations.

In an embodiment, a source dataset serves as a source of truth, and the replication service serves as an intermediary for verifying consistency between the source dataset and the destination datasets at the replication destinations. The replication service is a horizontally scalable service that replicates source datasets to multiple replication destinations. The horizontally scalable nature of the replication service allow the replication service to distribute sample data from a source dataset for verification to multiple replication destinations that collectively contribute to the verification of the source dataset by executing a portion of the verification.

In an embodiment, the system executes a probabilistic method for detecting data drift between the source dataset and the replication destinations. The system performs statistical analysis to quantity the probability of detecting (or not detecting) data drift. Additionally, the system verifies samples in accordance with a sampling protocol that provides statistical assurance to an X % confidence level that the sampling protocol will detect a data drift of Y % relative to the source dataset.

One or more embodiments described in this Specification and/or recited in the claims may not be included in this General Overview section.

2. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components; example services include billing software, monitoring software, logging software, load balancing software, clustering software, etc. Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on the VMs, deploy middleware such as databases, create storage buckets for workloads and backups, and install enterprise software into that VM. Customers can then use the provider's services to perform various functions, including balancing network traffic, troubleshooting application issues, monitoring performance, and managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling (OS), middleware, and/or application deployment such as on self-service virtual machines. The self-service virtual machines can be spun up on demand.

In some examples, IaaS provisioning may refer to acquiring computers or virtual hosts for use, even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how components interact) can be defined by one or more configuration files. Thus, the overall topology of the infrastructure (e.g., what resources depend on one another and how resources work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually and/or using a provisioning tool) prior to deployment of code to be executed on the infrastructure. However, in some examples, the infrastructure that will deploy the code may first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers, including personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems such as Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. The app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively coupled to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119. The service tenancy 119 may otherwise be isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users,' or other customers,' resources. Also, this embodiment may allow users or customers of the system to store databases privately without needing to rely on public Internet 154 for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119. The service tenancy 119 may be isolated from public Internet 154.

Figure 2:
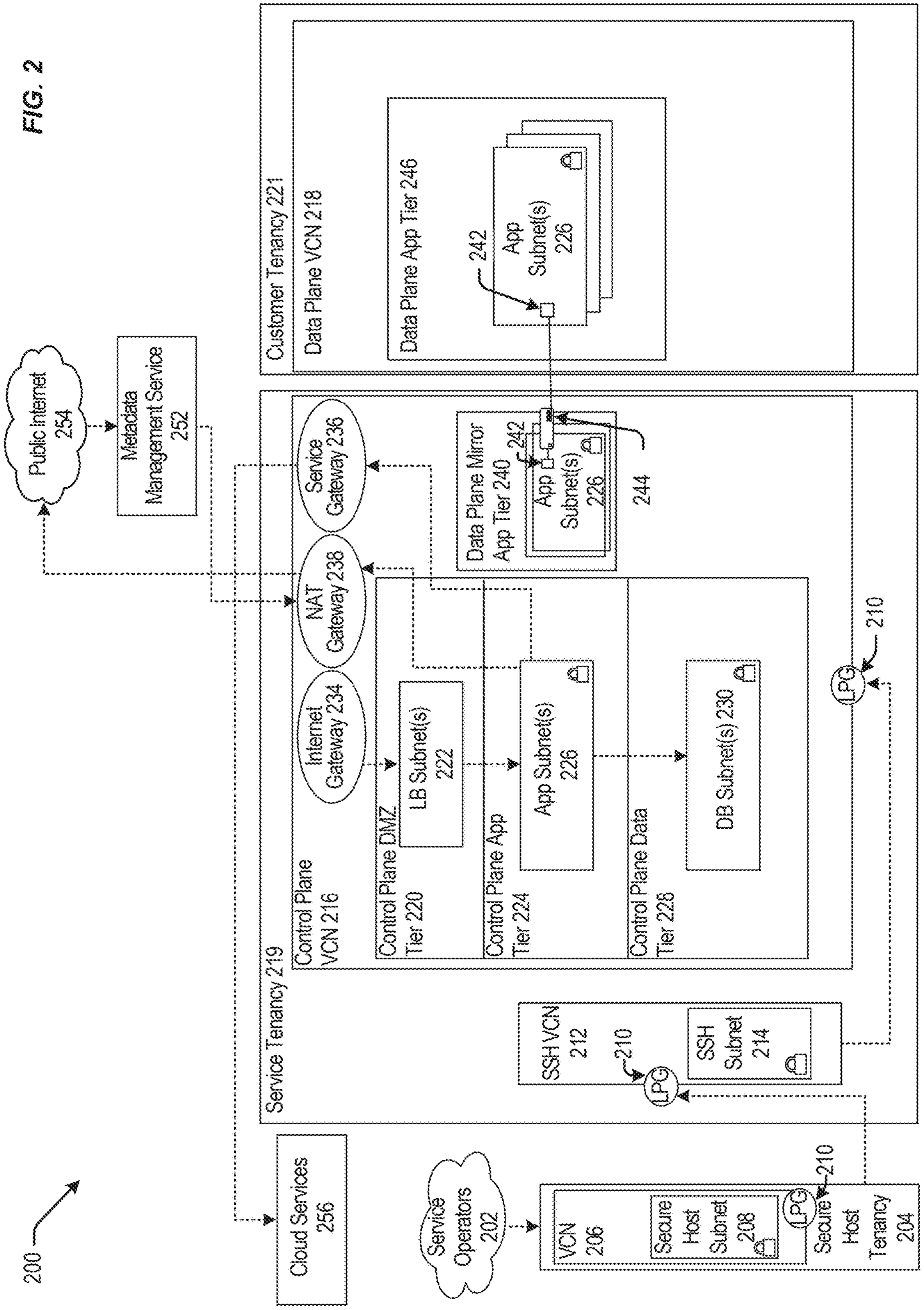

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively coupled to cloud services 256 (e.g., cloud services 156 of FIG. 1).

In some examples, the data plane VCN 218 can be contained in the customer tenancy 221. In this case, the IaaS provider may provide the control plane VCN 216 per customer, and the IaaS provider may, for the customer, set up a unique, compute instance 244 that is contained in the service tenancy 219. Compute instance 244 may allow communication between the control plane VCN 216 contained in the service tenancy 219 and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment or other usage of resources of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1" may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
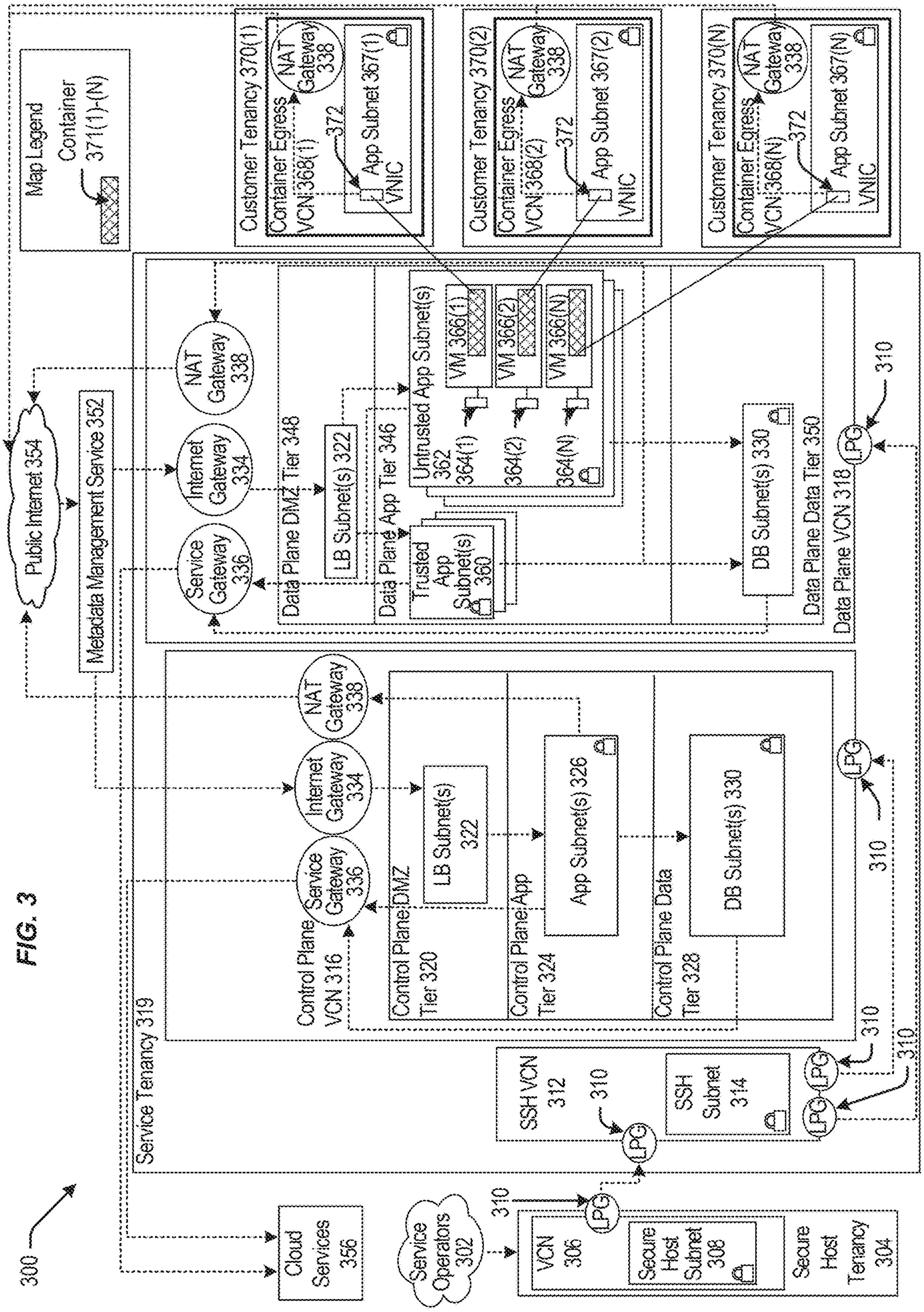

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360, untrusted app subnet(s) 362 of the data plane app tier 346, and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Tenant(s) VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether or not to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code), where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of the customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
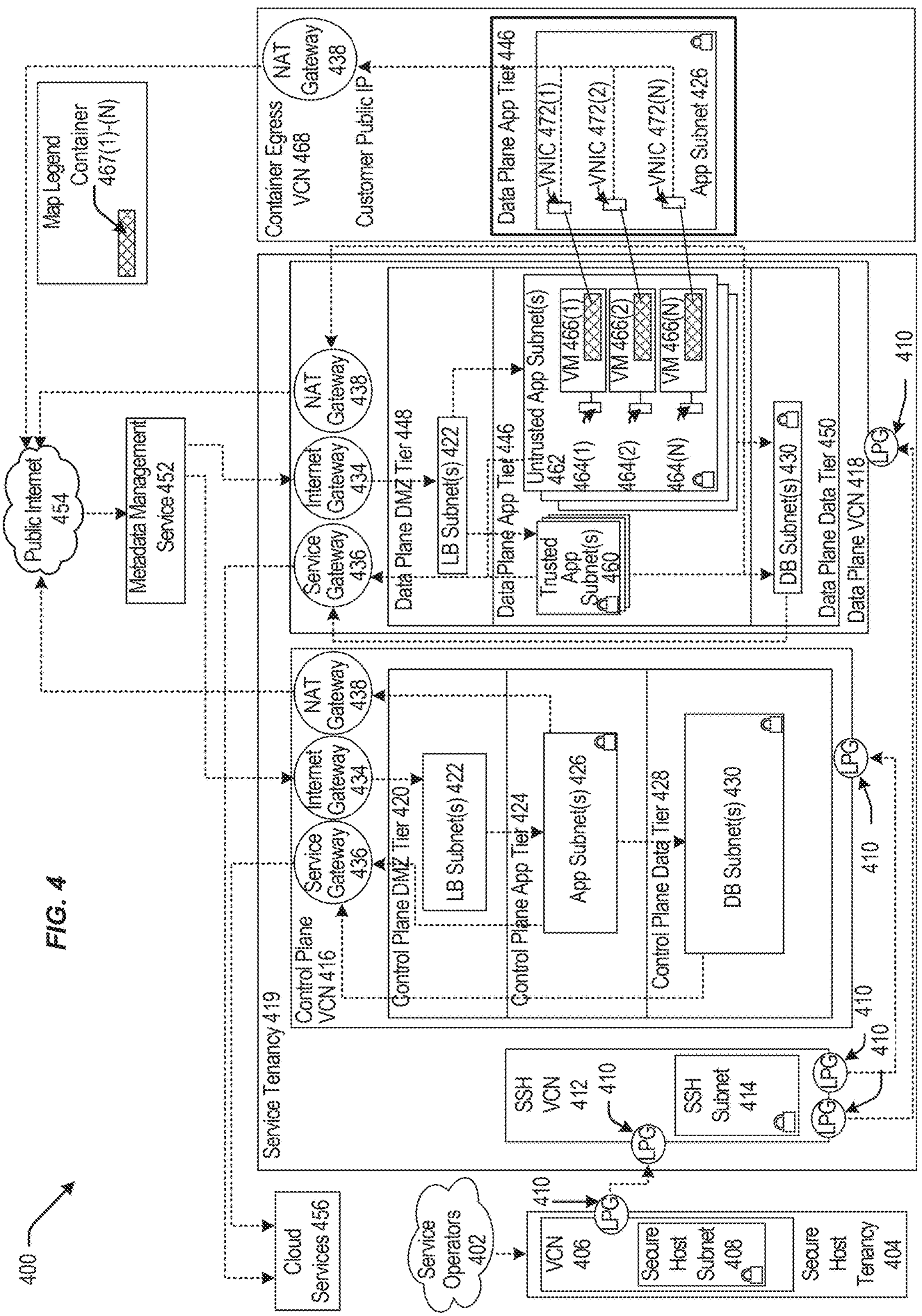

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively coupled to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for customers can be accessed in real-time by the customer. The containers 467 (1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that request a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 may include components that are different and/or additional to the components shown in the figures. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from one other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as “hosts”) may execute a client process and/or a server process. A client process makes a request for a computing service (such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. A node in an overlay network corresponds to a respective node in the underlying network. Hence, a node in an overlay network is associated with both an overlay address (to address to the overlay node) and an underlay address (to address the underlay node that implements the overlay node). An overlay node may be a digital device and/or a software process, such as a virtual machine, an application instance, or a thread. A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an API.

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of one another. Network resources are dynamically assigned to the requests and/or clients on an on-demand basis. Network resources assigned to a request and/or client may be scaled up or down based on one or more of the following: (a) the computing services requested by a particular client, (b) the aggregated computing services requested by a particular tenant, or (c) the aggregated computing services requested of the computer network. Such a computer network may be referred to as a “cloud network.”

In an embodiment, a service provider provides a cloud network to one or more end users. Various service models may be implemented by the cloud network, including, but not limited, to Software-as-a-Service (SaaS), Platform-as-a-Service (PaaS), and Infrastructure-as-a-Service (IaaS). In SaaS, a service provider provides end users the capability to use the service provider’s applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including, but not limited to, a private cloud, a public cloud, and a hybrid cloud. In a private cloud, network resources are provisioned for exclusive use by a particular group of one or more entities; the term “entity” as used herein refers to a corporation, organization, person, or other entity. The network resources may be local to and/or remote from the premises of the particular group of entities. In a public cloud, cloud resources are provisioned for multiple entities that are independent from one another (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on one other. A call from an application at the private cloud to an application at the public cloud (and vice versa) may be executed through the interface.

In an embodiment, tenants of a multi-tenant computer network are independent of one another. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with other tenants. Various tenant isolation approaches may be used.

In an embodiment, a tenant is associated with a tenant ID. The network resource of the multi-tenant computer network is tagged with a tenant ID. A tenant is permitted access to a particular network resource when the tenant and the particular network resources are associated with a same tenant ID.

In an embodiment, a tenant is associated with a tenant ID. An application, implemented by the computer network, is tagged with a tenant ID. Additionally, or alternatively, data structures and/or datasets, stored by the computer network, are tagged with a tenant ID. A tenant is permitted access to a particular application, data structure, and/or dataset when the tenant and the particular application, data structure, and/or dataset are associated with a same tenant ID.

As an example, a database implemented by a multi-tenant computer network may be tagged with a tenant ID. A tenant associated with the corresponding tenant ID may access data of a particular database. As another example, an entry in a database implemented by a multi-tenant computer network may be tagged with a tenant ID. A tenant associated with the corresponding tenant ID may access data of a particular entry. However, multiple tenants may share the database.

In an embodiment, a subscription list identifies a set of tenants, and, for a particular tenant, a set of applications that the particular tenant is authorized to access. For a particular application, a list of tenant IDs of tenants authorized to access the particular application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. Computer System

Figure 5:
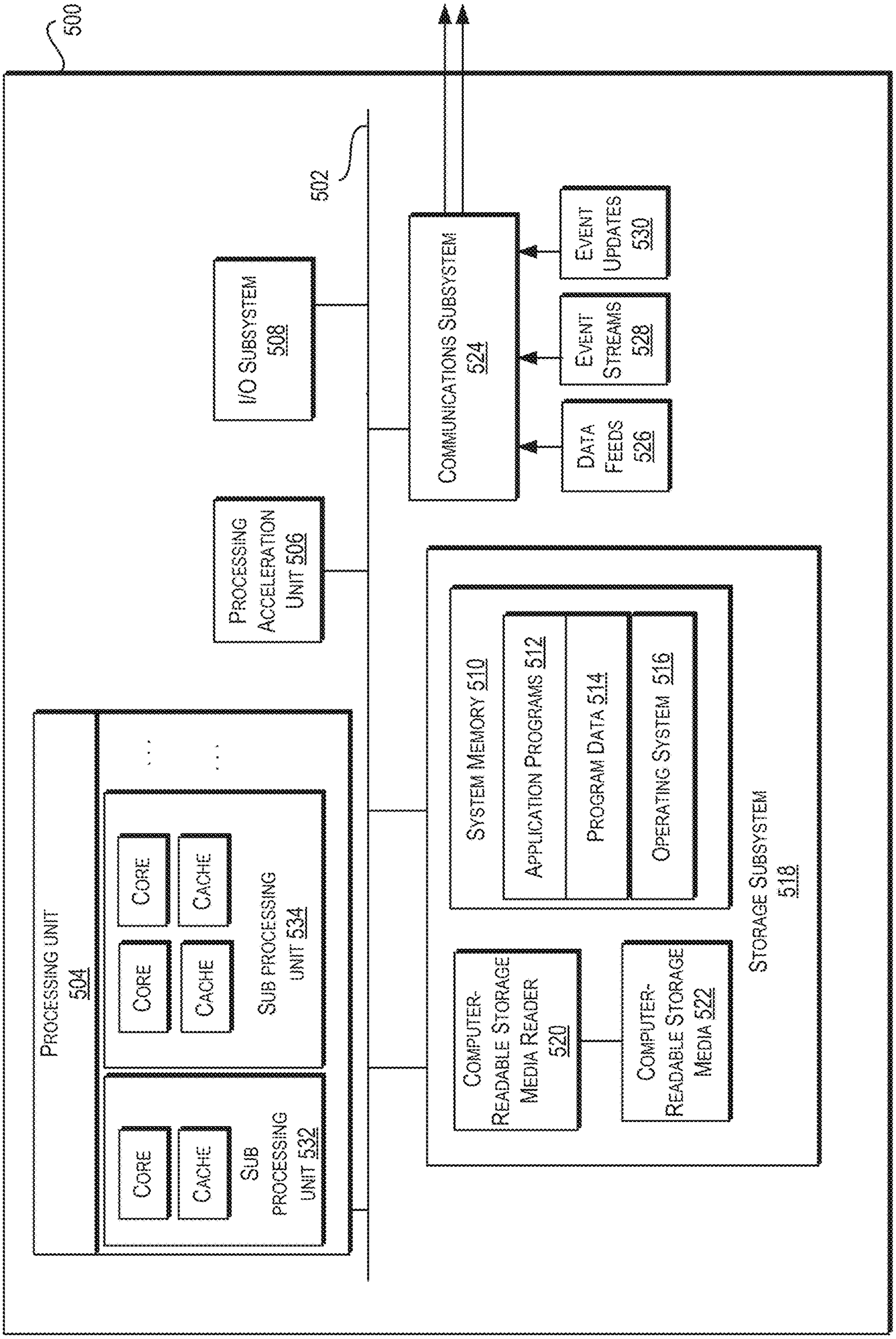
FIG. 5 is a hardware system in accordance with one or more embodiments.

FIG. 5 illustrates an example computer system 500. An embodiment of the disclosure may be implemented upon the computer system 500. As shown in FIG. 5, computer system 500 includes a processing unit 504 that communicates with peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 to communicate with one another as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Additionally, such architectures may be implemented as a Mezzanine bus manufactured to the IEEE P1386.1 standard.

Processing unit 504 controls the operation of computer system 500. Processing unit 504 can be implemented as one or more integrated circuits (e.g., a conventional microprocessor or microcontroller). One or more processors may be included in processing unit 504. These processors may include single core or multicore processors. In certain embodiments, processing unit 504 may be implemented as one or more independent processing units 532 and/or 534 with single or multicore processors included in the processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, the program code to be executed can be wholly or partially resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include medical imaging input devices such as computed tomography, magnetic resonance imaging, position emission tomography, or medical ultrasonography devices. User interface input devices may also include audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include any type of device and mechanism for outputting information from computer system 500 to a user or other computer. For example, user interface output devices may include, without limitation, a variety of display devices that visually convey text, graphics, and audio/video information, such as monitors, printers, speakers, headphones, automotive navigation systems, plotters, voice output devices, and modems.

Computer system 500 may comprise a storage subsystem 518 that provides a tangible non-transitory computer-readable media for storing software and data constructs that provide the functionality of the embodiments described in this disclosure. The non-transitory computer-readable media includes instructions that cause performance of operations described herein. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components, including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs may be loaded into system memory 510 including, but not limited to, client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random-access memory (RAM)) and/or non-volatile memory (such as read-only memory (ROM), flash memory, etc.). Different types of RAM configurations may be provided, including a static random-access memory (SRAM), a dynamic random-access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500, including instructions executable by processing unit 504 of computer system 500.

Computer-readable storage media 522 can include any appropriate media known or used in the art, including storage media and communication media, such as but not limited to volatile and non-volatile, removable, and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory, such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components to access wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams. The continuous data streams may include event streams 528 of real-time events and/or event updates 530 that may be continuous or unbounded in nature with no explicit end. Examples of applications that generate continuous data may include sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
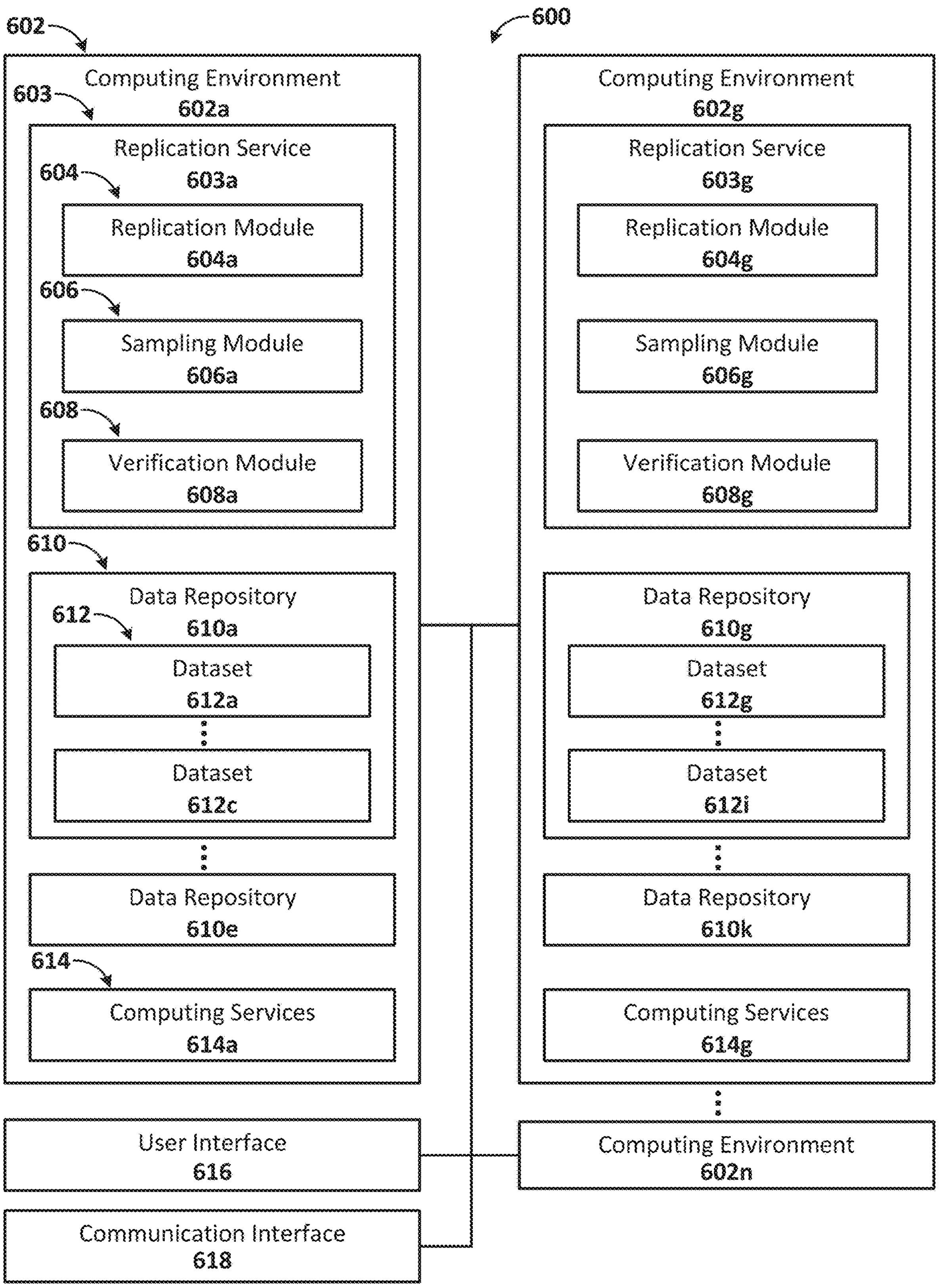
FIG. 6 illustrates features of an example system for executing operations pertaining to replicating data and verifying consistency between datasets in accordance with one or more embodiments.

4. System Architecture for Executing Operations Pertaining to Replicating Data and Verifying Consistency Between Datasets FIG. 6 illustrates features of an example system 600 for executing operations pertaining to replicating data and verifying consistency between datasets in accordance with one or more embodiments. In one or more embodiments, the system 600 refers to hardware and/or software configured to perform operations described herein. Examples of operations are described below with reference to FIGS. 7A-7D and FIG. 8. In one example, the system described with reference to FIG. 6 may include one or more features described above in Section 2, titled "Cloud Computing Technology," and/or in Section 3, titled "Computer System." Additionally, or alternatively, the system described with reference to FIG. 6 may include one or more features described below Section 6, titled "Example Machine Learning System.

In one or more embodiments, the system 600 may include more or fewer components than the components described with reference to FIG. 6. The components described with reference to FIG. 6 may be local to or remote from each other. The components described with reference to FIG. 6 may be implemented in software and/or hardware. The components of system 600 may be distributed over multiple applications and/or machines. Multiple components may be combined into one application and/or machine. Operations described with respect to one component may instead be performed by another component.

A. Example Computing Environments

As shown in FIG. 6, the system 600 includes multiple computing environments 602, such as computing environment 602*a*, computing environment 602*g*, and computing environment 602*n*. The system 600 may replicate data between one or more sets of computing environments 602. The data can be replicated from a source computing environment to a destination computing environment. As used herein, the term "source computing environment" refers to a computing environment 602 that replicates data to a destination computing environment. As used herein, the term "destination computing environment" refers to a computing environment 602 that receives data for replication from a source computing environment. A particular computing environment 602 may be a source computing environment with respect to one or more destination computing environments. Additionally, or alternatively, the particular computing environment 602 may be a destination computing environment with respect to one or more source computing environments. Additionally, or alternatively, the system 600 may replicate data between datasets located within the particular computing environment 602. In one example, computing environment 602*a* is a source computing environment with respect to computing environment 602*g* and/or computing environment 602*n*. Additionally, or alternatively, computing environment 602*g* may be a destination computing environment with respect to computing environment 602*a* and/or computing environment 602*n*.

In one example, the system 600 includes multiple computing environments 602 that represent nodes of a distributed state system. As used herein, the term "distributed state system" refers to a network of interconnected, independent computing nodes that collectively provide functionality through multiple replicated sources, for example, to enhance reliability, availability, and/or performance. The nodes of the distributed state system represent separate computing environments 602 that respectively include one or more components or datasets that are replicated between the respective computing environments 602. Example distributed state systems include distributed databases that provide access to replicated datasets, cloud platforms that deliver scalable services from replicated compute instances, and content delivery networks that deliver content from multiple redundant sources.

As shown in FIG. 6 with reference to computing environment 602*a* and 602*g*, a computing environment 602 may include a replication service 603. The replication service is utilized to replicate data from a source computing environment to one or more destination computing environments via one or more replication channels. The one or more replication channels may be utilized to stream replication data, for example, in the form of data messages, from the source computing environment to the one or more destination computing environments. Additionally, the replication channel may be utilized to stream sample data, for example, in the form of control messages, between one or more computing environments 604 that utilize the replication service 603.

The replication service 603 is horizontally scalable to handle replication from a source computing environment to multiple destination computing environments. Additionally, the replication service 603 is horizontally scalable to utilize multiple destination computing environments to execute verification processes that includes comparing source data samples to destination datasets to verify consistency between the destination dataset and the source data sample. In one example, the replication service 603 may transmit different source data samples that represent different subsets of a source dataset to different destination computing environments for comparison against different instance of the destination datasets that were replicated from the source dataset to the different destination computing environments. With multiple destination computing environments performing a portion of the verification, the processing capacity and/or time for performing the verification is shared across the multiple destination computing environments. As a result, a relatively larger portion of the source dataset can be verified against the different destination datasets while consuming a relatively small amount of processing capacity of a particular destination computing environment. Additionally, with multiple destination computing environments performing a portion of the verification, a relatively larger portion of the source dataset can be verified relative quickly in comparison to a particular destination computing environment performing the entire verification process. Furthermore, with multiple destination computing environments performing a portion of the verification, the system avoids redundant verification processes across the multiple destination computing environments.

The replication service 603 may include a replication module 604, a sampling module 606, and a verification module 608. Additionally, or alternatively, a computing environment 602 may include one or more data repositories 610. A data repository 610 may include one or more datasets 612 stored therein. Additionally, or alternatively, a computing environment 602 may include one or more computing services 614. As shown, computing environment 602*a* includes replication module 604*a*, sampling module 606*a*, and verification module 608*a*. Additionally, computing environment 602*a* includes data repository 610*a* and data repository 610*e*. Data repository 610*a* includes dataset 612*a* and dataset 612*c* stored therein. Additionally, computing environment 602*a* includes computing services 614*a*. As further shown, computing environment 602*g* includes replication module 604*g*, sampling module 606*g*, and verification module 608*g*. Additionally, computing environment 602*g* includes data repository 610*g* and data repository 610*k*. Data repository 610*g* includes dataset 612*g* and dataset 612*i* stored therein. Additionally, computing environment 602*g* includes computing services 614*g*.

A replication module 604 of a computing environment 602 executes operations pertaining to replicating data from the computing environment 602 to one or more destination computing environments. The replication module 604 may execute operations pertaining to replicating data from one or more data repositories 610 and/or from one or more datasets 612 stored in a data repository 610. Additionally, or alternatively, the replication module 604 may execute operations pertaining to replicating data from one or more computing services 614*a*. In one example, replication module 604*a* executes operations pertaining to accessing data from computing environment 602*a* and transmitting the data to one or more destination computing environments for replication therein. In one example, replication module 604*g* executes operations pertaining to receiving data from one or more source computing environments and storing the data for replication in computing environment 602*g*.

In one example, replication module 604*a* accesses data from data repository 610*a* and transmits the data to computing environment 602*g*. Replication module 604*g* receives the data from computing environment 602*a* and stores the data in data repository 610*g*. The operations of replication module 604*a* and 604*g* may be coordinated with one another to replicate data from data repository 610*a* to data repository 610*g*. In one example, replication module 604*a* and replication module 604*g* cooperate with one another to replicate data from dataset 612*a* to dataset 612*g* and/or from dataset 612*c* to dataset 612*i*. Additionally, or alternatively, replication module 604*a* and replication module 604*g* may replicate data from data repository 610*e* to data repository 610*k* and/or from computing services 614*a* to computing services 614*g*.

A sampling module 606 executes operations pertaining to obtaining sample data for verifying consistency between replicated datasets. The sampling module 606 may obtain sample data from a dataset, generate a control message that includes the sample data, and transmit the control message to one or more computing environments 602 for verification against a replication of the dataset. The sampling module 606 may obtain sample data in response to control events. One or more components of the system 600 may generate control events in accordance with a sampling protocol that trigger the sampling module 606 to obtain sample data in accordance with the sampling protocol. In one example, the sampling module 606 monitors one or more conditions or occurrences corresponding to the sampling protocol, generates control events in response to the one or more conditions or occurrences, and obtains sample data in response to the control events. Additionally, or alternatively, other components of the system 600 may monitor one or more conditions or occurrences corresponding to the sampling protocol, generate control events in response to the one or more conditions or occurrences, and transmit the control events to the sampling module 606. As examples, control events can be transmitted to the sampling module 606 directly via an API, via control messages from a message queuing system, or via a subscription channel to which the sampling module 606 subscribes. In response to receiving control events, the sampling module 606 interprets the control events and obtains sample data in accordance with the control event. The sampling module 606 may analyze metadata of a control event, match the metadata to predefined rules or conditions, and obtain samples according to the predefined rules or conditions. The predefined rules or conditions may specify one or more parameters for obtaining sample data, such as a dataset for obtaining the sample data, how to select the sample data, and/or a quantity of sample data to obtain. Example sampling protocols are further described below with reference to subsection B of section 4, titled "Example Sampling Protocols." As used herein, the term "control event" refers to a logical abstraction that signifies an occurrence of a condition or event that triggers an action. As used herein, the term "control message" refers to a communication message transmitted between computing entities, such as between a source computing entity of a source computing environments and a destination computing entity of a destination computing environment. Control messages can be utilized to facilitate synchronization, coordination, monitoring, resource management, state updates, fault detection, and/or error handling. Control messages may include metadata, instructions, and status information. Control messages can be generated and transmitted in response to control events. Additionally, or alternatively, control messages can include control events and/or information about control events. Control messages are distinct from data messages that include application-level data, for example, for processing, storage, and/or delivery to users.

In one example, replication modules 604 transmit data for replication between computing environments via data messages, and sampling modules 606 transmit sample data for verifying consistency between replicated datasets via control messages. In one example, a replication module 604 and a sampling module 606 utilize a same replication stream for transmitting data messages and control messages, respectively. The sampling module 606 may utilize an encoding mechanism to add control messages to the replication stream. The encoding mechanism may utilize a predefined schema, such as field identifiers, tags, flags, offsets, lengths, and/or data types. Control messages can be distinguished from data messages based on the predefined schema. Additionally, or alternatively, the contents of control messages can be extracted based on the predefined schema.

A verification module 608 executes operations pertaining to comparing sample data to datasets for verifying consistency between replicated datasets. A verification module 608 may receive sample data, for example, in a control message, from one or more computing environments 602. The verification module 608 may receive the control messages from a replication stream utilized to replicating data between one or more computing environments 602. The verification module 608 identifies the control messages and/or distinguishes the control messages based on a decoding mechanism. The decoding mechanism utilizes at least a portion of the predefined schema of the encoding mechanism to identify control messages and/or to extract content from the control messages. Based on the control messages, the verification module 608 determines a dataset corresponding to the sample data and compares the sample data to the dataset to verify consistency between the dataset corresponding to the sample data and the dataset represented by the sample data. When the verification module 608 successfully verifies consistency between datasets, the verification module 608 may classify the datasets as being consistent. Additionally, or alternatively, when the verification module 608 determines an inconsistency between datasets, the verification module 608 may classify the datasets as being inconsistent. The inconsistency may include missing data and/or mismatched data. Additionally, or alternatively, the inconsistency may include data drift. Example forms of data drift are further described below in subsection B of this section 4, titled "Example Sampling Protocols."

The verification module 608 may generate and transmit a control message to the computing environment 602 that provided the sample data. The control message may include an indication as to whether the verification module 608 successfully verified consistency between datasets. Additionally, or alternatively, the control message may include an indication as to whether the verification module 608 determined an inconsistency between the datasets. The verification module 608 may initiate execution of one or more remediation operations in response to determining an inconsistency between datasets. The system 600 may execute one or more radiation operations when a verification fails to satisfy a consistency threshold. For example, the verification may fail to satisfy the consistency based on a magnitude of inconsistency.

In one example, the one or more remediation operations may include executing a process for resolving the inconsistency. Additionally, or alternatively, the one or more remediation operations may include generating an alarm signal. The process for resolving the inconsistency may include initiating a replication process for replicating data from a source dataset to a destination dataset. Additionally, or alternatively, the process for resolving the inconsistency may include selecting a source dataset for replicating data to the destination dataset and/or excluding a source dataset for replicating data to the destination dataset. For example, the system may switch from source A to source B, and/or the system may exclude source A, for example, until the inconsistency is resolved. In one example, the system 600 resolves the inconsistency in accordance with a resolution policy. The resolution policy can be based on one or more of the following: timestamp recency, majority voting, custom resolution logic, or manual intervention. Additionally, or alternatively, the one or more remediation operations may include resolving the inconsistency by initiating an update, rollback, or replay. Additionally, or alternatively, the one or more remediation operations may include quarantining the data and/or disqualifying the data as a source for one or more computing entities that may access data from various replications of the data.

In one example, computing environment 602*a* is a source relative to computing environment 602*g*, and computing environment 602*g* is a destination relative to computing environment 602*a*. Data is replicated from one or more source datasets of computing environment 602*a* to one or more destination datasets of computing environment 602*g*. In one example, the system 600 verifies consistency between the one or more source datasets and the one or more destination datasets based on samples obtained from the one or more source datasets that are transmitted in one or more control messages from the source computing environment to the destination computing environment. Additionally, or alternatively, the system 600 may verify consistency between the one or more destination datasets and the one or more source datasets based on samples obtained from the one or more destination datasets that are transmitted in one or more control messages from the destination computing environment to the source computing environment. In one example, the control message includes metadata that identifies a source dataset corresponding to a source data sample. Additionally, or alternatively, the metadata may identify a destination dataset corresponding to the source dataset and/or the source data sample.

In one example, sampling module 606*a* obtains source data samples from one or more source datasets of computing environment 602*a*. The system 600 utilizes the source data samples to verify consistency between the one or more source datasets and the replications of the one or more source datasets in the one or more destination datasets of computing environment 602*g*. Sampling module 606*a* generates control messages that include the source data samples and transmits the control messages to computing environment 602*g*, for example, via a data replication channel. Sampling module 606*a* may obtain source data samples from data repository 610*a* for verifying consistency between a destination dataset stored in data repository 610*g* and a source dataset stored in data repository 610*a*. For example, sampling module 606*a* may obtain source data samples from dataset 612*a* to verify consistency between dataset 612*a* and dataset 612*g*. Additionally, or alternatively, sampling module 606*a* may obtain source data samples from dataset 612*c* to verify consistency between dataset 612*c* and dataset 612*i*. Additionally, or alternatively, sampling module 606*a* may obtain source data samples from computing services 614*a* to verify consistency between computing services 614*g* and computing services 614*a*.

Verification module 608*g* may receive control messages from computing environment 602*a* that include source data samples from one or more source datasets of computing environment 602*a*. Verification module 608*g* determines one or more destination datasets corresponding to the source data sample and compares the one or more source data samples to the one or more destination datasets. In one example, verification module 608*g* and/or sampling module 606*g* obtain one or more destination data samples corresponding to the one or more source data samples. Verification module 608*g* may verify consistency between the one or more source datasets and the one or more destination datasets based on a comparison of the one or more source data samples to the one or more destination data samples.

In one example, sampling module 606*g* obtains destination data samples from one or more destination datasets of computing environment 602*g*. The system utilizes the destination data samples to verify consistency between the one or more destination datasets and the replications of the one or more destination datasets in the one or more source datasets of computing environment 602*a*. Sampling module 606*g* generates control messages that include the destination data samples and transmits the control messages to computing environment 602*g*, for example, via an upstream communication channel. Sampling module 606*g* may obtain destination data samples from data repository 610*g* for verifying consistency between a source dataset stored in data repository 610*a* and a destination dataset stored in data repository 610*g*. For example, sampling module 606*g* may obtain destination data samples from dataset 612*g* to verify consistency between dataset 612*g* and dataset 612*a*. Additionally, or alternatively, sampling module 606*g* may obtain destination data samples from dataset 612*i* to verify consistency between dataset 612*i* and dataset 612*c*. Additionally, or alternatively, sampling module 606*g* may obtain destination data samples from computing services 614*g* to verify consistency between computing services 614*a* and computing services 614*g*.

Verification module 608*a* may receive control messages from computing environment 602*g* that include destination data samples from one or more destination datasets of computing environment 602*g*. Verification module 608*a* determines one or more source datasets corresponding to the destination data sample and compares the one or more destination data samples to the one or more source datasets. In one example, verification module 608*a* and/or sampling module 606*a* obtain one or more source data samples corresponding to the one or more destination data samples. Verification module 608*a* may verify consistency between the one or more destination datasets and the one or more source datasets based on a comparison of the one or more destination data samples to the one or more source data samples.

In one or more embodiments, a data repository 610 may include any type of storage unit and/or device (e.g., a file system, database, collection of tables, or any other storage mechanism) for storing data. Furthermore, a data repository 610 may include multiple different storage units and/or devices. The multiple different storage units and/or devices may or may not be of the same type or located at the same physical site. Furthermore, a data repository 610 may be implemented or executed on the same computing environment 602 of one or more other components of the system 600 and/or on a different computing environment 602 of one or more other components of the system 600. Additionally, or alternatively, a data repository 610 may be implemented or executed on a computing system that is separate from the system 600. The data repositories 610 and/or the various other components of the computing environments 602 may be communicatively coupled to one another via a direct connection or via a network.

B. Example Sampling Protocols

The system 600 may obtain samples from datasets based on one or more sampling protocols. The sampling protocol may include one or more parameters that specify an amount of sampling that is performed, such as a quantity or proportion of a source dataset or destination dataset that is sampled, a time interval for performing sampling, or a sampling rate per unit of time. Additionally, or alternatively, the sampling protocol may include weighting factors that are based on the attributes of the replication process. The weighting factors may be applied to one or more of the following: the quantity of samples, the timing of sampling, or portions of the dataset to be sampled. The weighting factors may correspond to a likelihood that a particular record is selected as a sample.

The one or more parameters of the sampling protocol may provide statistical assurance to a specified confidence level that the sampling protocol will detect a data drift of a specified magnitude. For example, the sampling protocol may provide statistical assurance to an X % confidence level that the sampling protocol will detect a data drift of Y % relative to the source data. In one example, the sampling protocol provides statistical assurance to a 99.9% confidence level that the sampling protocol will detect a data drift of 0.1% relative to the source data.

As used herein, the term "data drift" refers to a gradual divergence between a source dataset and a replication of the source dataset represented as a destination dataset. Data drift can occur over time due to changes in the source dataset that are not immediately reflected in the destination dataset, synchronization issues, and/or external factors. As examples, data drift can arise from latency in replication, schema changes, and/or data conflicts in bi-directional or multi-directional replication systems. Data drift may include one or more of the following: integrity drift, volume drift, time drift, field drift, or schema drift.

Integrity drift represents unintended alterations to data. Integrity drift may arise from one or more of the following: software defects, hardware malfunctions, transmission errors, data type conversions, or concurrency issues. In one example, integrity drift may arise from concurrency issues in a distributed state system. For example, integrity drift may arise from race conditions, deadlocks, or improper synchronization, resulting in partial or incorrect updates to data.

Volume drift represents a difference in an amount of data between a source dataset and a destination dataset. Volume drift refers to discrepancies in the total size of data, such as missing records, incomplete transfers, or inconsistencies in data storage size. Volume drift may arise from one or more of the following: incomplete data transfers, data loss during replication, differences in data compression formats, filtered replication, data pruning, bi-directional replication, or conflicting updates.

Time drift represents how much of the data replication at the destination is delayed compared to the source. Time drift may arise from one or more of the following: network latency, batch processing, slow synchronization intervals, system bottlenecks, replication backlogs, asynchronous replication, concurrency issues, transaction commit delays, or geographic distribution of data sources.

Field drift represents discrepancies in individual fields within records, for example, even if the records themselves are present in both the source dataset and the destination dataset. Field drift may arise as a result of one or more of the following: partial updates, transformation errors, data type mismatches, timestamp discrepancies, audit trail discrepancies, or data entry errors.

Schema drift arises when the structure (schema) of data changes in a source dataset but is not reflected in the destination dataset, resulting in inconsistencies in how the data is organized or stored. Schema drift may arise from one or more of the following: schema evolution, versioning mismatch, uncoordinated schema updates, missing constraints, or inconsistent data type definitions.

In one example, the system verifies an absence of data drift between a source dataset and a destination dataset. The system may determine the absence of data drift when the consistency verification satisfied a data drift threshold. The data drift threshold may represent a magnitude of data drift. In one example, the system verifies an absence of data drift that includes volume drift or time drift. Additionally, or alternatively, the system may determine an absence of data drift that includes one or more other forms of data drift.

In one example, the sampling protocol is configured based on one or more attributes of the replication system and/or replication process. These attributes may influence how, where, or when discrepancies in replicated data may arise. The attributes may include detected events that occurred during one or more current or previous instances of executing the replication process. Additionally, or alternatively, the attributes may include a source application or system associated with the source dataset. Additionally, or alternatively, the attributes may include a destination application or system associated with the destination dataset. Additionally, or alternatively, the attributes may include a type or category of a replication process utilized by the replication system and/or a type or category of data being replicated.

In one example, the system 600 includes a machine learning system that utilizes one or more machine learning models that are configured to determine a sampling protocol, for example, based on the attributes of the replication process. The machine learning system can provide different sampling protocols as the attributes change. Additionally, or alternatively, the machine learning system can be retrained as the attributes change. In one example, the system 600 determines a set of attributes of the replication process and utilizes one or more machine learning models to configure a sampling protocol for the sampling process based on the set of attributes of the replication process. Upon determining the sampling protocol, the system 600 executes the sampling process in accordance with the sampling protocol. Example features of a machine learning system are further described below with reference to FIGS. 9 and 10.

C. Example Replication System

In one example, the system 600 includes a source dataset, a recent snapshot dataset, and a destination dataset. The system 600 may store the source dataset in computing environment 602*a*, such as in data repository 610*a*. The system 600 may store the recent snapshot dataset in computing environment 602*g* such as in data repository 610*g*. The recent snapshot dataset represents a snapshot of the source dataset. The system 600 may periodically update the snapshot of the source dataset by replicating data from the source dataset to the recent snapshot dataset. The system 600 may replicate data to the destination dataset, for example, from the recent snapshot dataset and/or the source dataset. The system 600 may store the destination dataset in computing environment 602*n* such as in a data repository 610 of computing environment 602*n*.

In one example, the system 600 performs a bootstrapping process that includes replicating data to the destination dataset and verifying consistency between the destination dataset and the source dataset prior to setting the destination dataset to an active state for use in the computing environment 602. In one example, the system 600 replicates data from the recent snapshot dataset to the destination dataset replicates then applies any changes to the source dataset that have occurred since the latest update to the recent snapshot by replicating data from the source dataset to the destination dataset. The system 600 may verify consistency between the destination dataset and the source dataset based on a comparison between one or more of the following: (a) the source dataset and the recent snapshot dataset (e.g., the recent snapshot dataset may be considered the destination dataset); (b) the recent snapshot dataset and the destination dataset (e.g., the recent snapshot dataset may be considered the source dataset); or (c) the source dataset and the destination dataset.

In one example, the bootstrapping process includes one or more sampling processes. The bootstrapping process may include performing a first sampling process to verify consistency between the recent snapshot dataset to the source dataset. The system 600 may perform the first sampling process prior to initiating the replication from the recent snapshot dataset to the destination dataset. The system 600 may determine whether a first consistency threshold is satisfied based on the comparison of the recent snapshot dataset to the source dataset. Based on verifying consistency between the recent snapshot dataset and the source dataset, the system 600 may replicate data from the recent snapshot dataset to the destination dataset, for example, as part of the bootstrapping process. After replicating data from the recent snapshot dataset to the destination dataset, the system 600 may perform a second sampling process to verify consistency between the destination dataset and the recent snapshot dataset. The system 600 may determine whether a second consistency threshold is satisfied based on the comparison of the destination dataset to the recent snapshot dataset.

Based on verifying consistency between the destination dataset to the recent snapshot dataset, the system 600 may determine that the recent snapshot dataset is successfully replicated to the destination dataset. Additionally, or alternatively, after replicating data from the recent snapshot dataset to the destination dataset, the system 600 may perform a third sampling process to verify consistency between the destination dataset and the source dataset. The system 600 may determine whether a third consistency threshold is satisfied based on the comparison of the destination dataset to the source dataset. Based on verifying consistency between the destination dataset to the recent snapshot dataset, the system 600 may set the destination dataset to an active state for use in the computing environment.

In one example, the system 600 is implemented in a distributed state system that includes multiple replications stored at different nodes of the distributed state system. The system may qualify or disqualify a replication as a source for accessing a state of the distributed state system based on determining that a level of data drift corresponding to the replication satisfies a drift threshold. Additionally, or alternatively, the system may prompt a node of the distributed state system to update a state of a replication to align with other nodes based on determining that a level of data drift meets a threshold for prompting a state update.

D. Example Interfaces

Referring further to FIG. 6, the system 600 may include a user device interface 616 communicatively coupled or couplable with one or more other components of the system 600. A user device interface 616 may include hardware and/or software configured to facilitate interactions between a user and various aspects of the system 600. The user device interface 616 may render user interface elements and receive input via user interface elements. For example, the user device interface 616 may display outputs generated by the system 600. Additionally, or alternatively, the user device interface 616 may be configured to provide inputs to the system 600. Examples of interfaces include a graphical user interface (GUI), a command line interface (CLI), a haptic interface, or a voice command interface. Examples of user interface elements include checkboxes, radio buttons, dropdown lists, list boxes, buttons, toggles, text fields, date and time selectors, command lines, sliders, pages, or forms. Any one or more of these interfaces or interface elements may be utilized by a user device interface 616.

In an embodiment, different components of a user device interface 616 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, a user device interface 616 may be specified in one or more other languages, such as Java, C, or C++.

Additionally, or alternatively, the system 600 may include one or more communications interfaces 618 communicatively coupled or couplable with one or more components of the system 600. The one or more communications interfaces 618 may include hardware and/or software configured to transmit data between respective components of the system 600 and/or to transmit data to and/or from the system 600. For example, a communications interface 618 may transmit and/or receive data between and/or among one or more computing environments 602 and/or components of the one or more computing environments 602.

In one example, the system 600 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a browser device.

5. Example Operations Pertaining to Replicating Data and Verifying Consistency Between Datasets Referring now to FIGS. 7A-7D and FIG. 8, example operations pertaining to replicating data and verifying consistency between datasets are further described. One or more operations described with reference to FIGS. 7A-7D and FIG. 8 may be modified, rearranged, or omitted. Accordingly, the particular sequence of operations described with reference to FIGS. 7A-7D and FIG. 8 should not be construed as limiting the scope of one or more embodiments. In one example, the operations described with reference to FIGS. 7A-7D and FIG. 8 may be performed by one or more features of the system described with reference to FIG. 6. Additionally, or alternatively, the operations described with reference to FIGS. 7A-7D and FIG. 8 may be performed by one or more features of the system described with reference to FIGS. 9 and 10.

A. Verifying Consistency Based on Source Data Samples

Figure 7A:
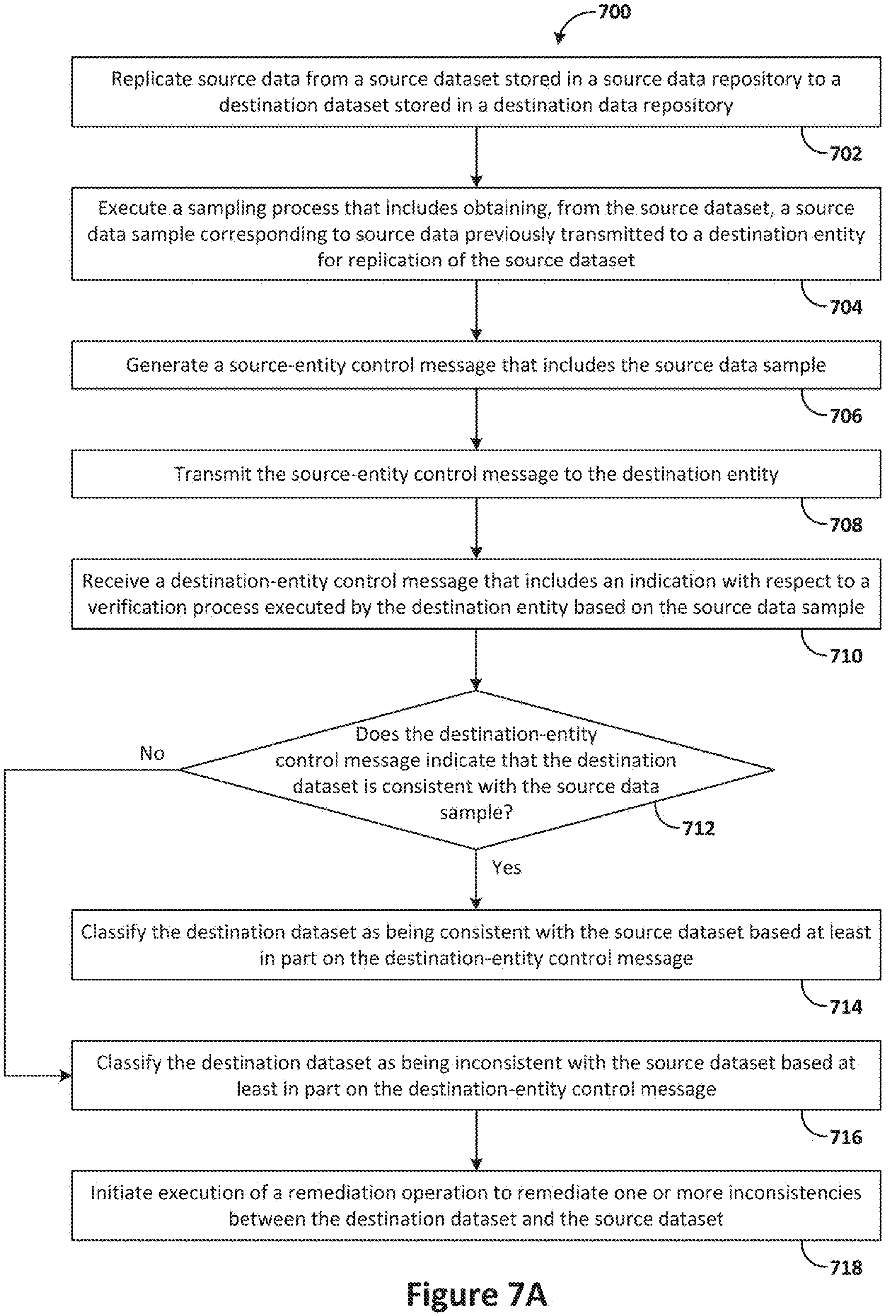
FIGS. 7A-7D are flowcharts that depict example operations pertaining to replicating data and verifying consistency between datasets in accordance with one or more embodiments.
Figure 7B:
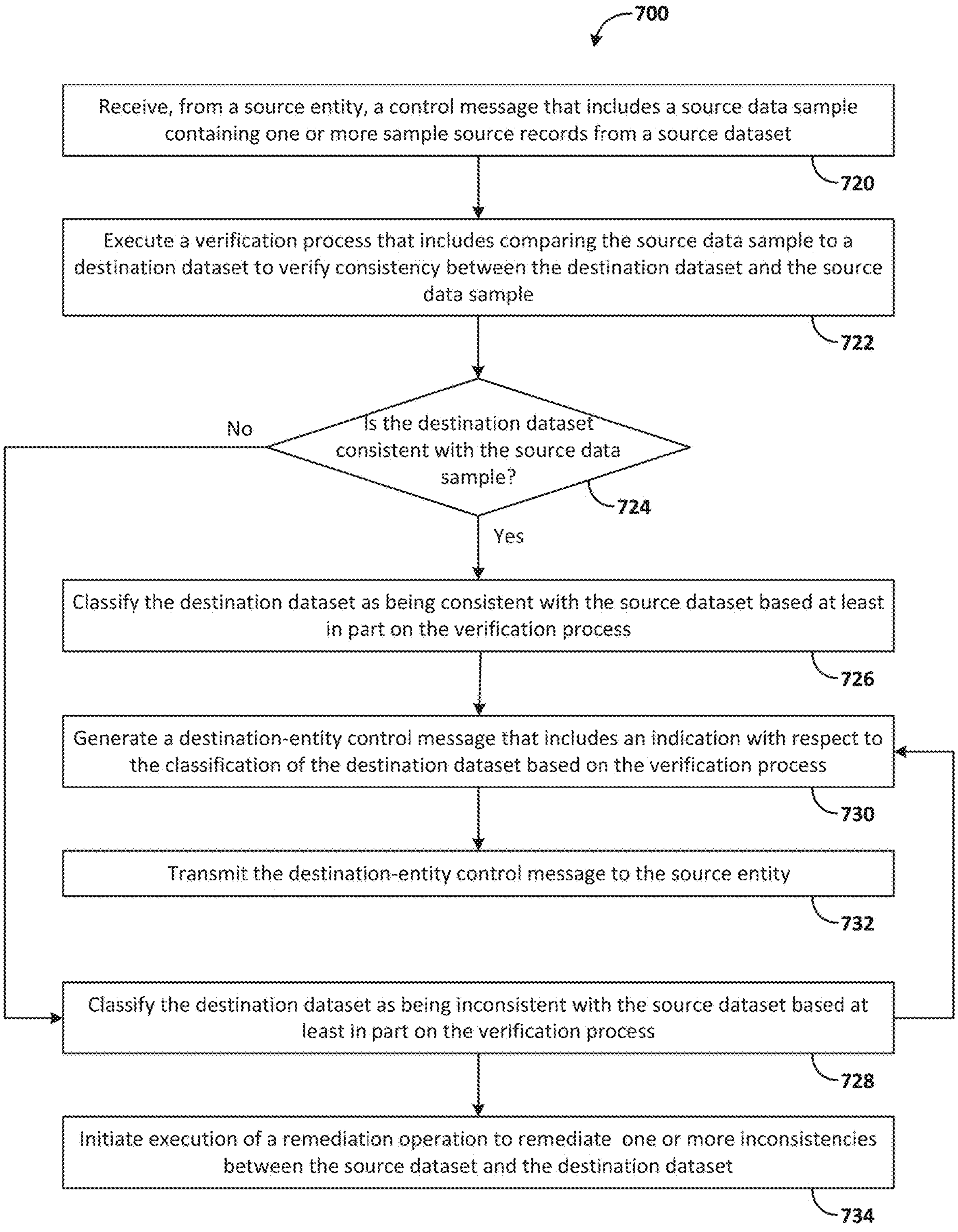

Referring to FIGS. 7A and 7B, operations 700 pertaining to verifying consistency between a destination dataset and a source dataset based on a source data sample are further described. As described with reference to FIG. 7A, a source entity may transmit a control message to a destination entity that includes a source data sample. As described with reference to FIG. 7B, the destination entity may verify consistency between the destination dataset and the source dataset based on the source data sample. As used herein, the term “source entity” refers to one or more computing entities associated with a computing environment that includes a source dataset that is replicated to a destination dataset associated with a destination entity. As used herein, the term “destination entity” refers to one or more computing entities associated with a computing environment that includes a destination dataset that is replicated from a source dataset associated with a source entity. A particular computing entity may be a source entity with respect to one or more destination entities. Additionally, or alternatively, the particular computing entity may be a destination entity with respect to one or more source entities.

As shown in FIG. 7A, the system replicates source data from a source dataset stored in a source data repository to a destination dataset stored in a destination data repository (Operation 702). The system may replicate the source data by executing a replication process. The replication process may include copying data or state from a source dataset to one or more destination datasets. The replication process may include a source entity detecting changes on the source dataset. The source entity may detect the changes based on observation of events in a transaction log and/or based on execution of a change data capture system. The source entity may serialize the changes to the source dataset into data messages for transmission to a destination entity. The source entity transmits the data messages to the destination entity via a network. The destination entity receives the messages and applies the changes to the destination dataset. The replication process may operate synchronously, where updates are acknowledged after being applied to all destination entities, or asynchronously, where updates are queued and sent after the source entity completes its operations. To prevent conflicts, the system may use versioning, timestamps, and/or vector clocks to track replication updates and/or to enforce ordering rules.

In a distributed state system, the replication process maintains a global state across nodes despite distributed operations. Respective nodes store a local replica of the state, and changes to the state are propagated to other nodes via the replication process. The system may utilize one or more consensus algorithms to enforce agreement on the sequence of state changes before they are committed. For distributed state systems that employ eventual consistency, updates are propagated without immediate agreement, allowing temporary divergence between replicas. Background reconciliation processes detect and resolve inconsistencies by comparing states and applying missing updates. Techniques like Merkle trees or diff-based synchronization algorithms may be used to optimize the detection and transmission of differences. If conflicts arise due to concurrent updates, conflict resolution policies may be utilized to determine how to reconcile the conflicting states. Example conflict resolution policies include causal ordering, last-write-wins, and application-defined logic.

In one example, the replication process may utilize batching to reduce communication overhead, with batches of updates transmitted periodically or based on configurable thresholds. Advanced implementations may incorporate sharding, where the global state is partitioned across nodes, and replication occurs within the relevant shard, reducing replication scope and improving scalability.

The operations described herein pertaining to verifying consistency between a destination dataset and a source dataset based on a source data sample may be utilized as part of the replication process, for example, as part of a synchronization process. Additionally, or alternatively, the operations described herein pertaining to verifying consistency between a destination dataset and a source dataset based on a source data sample may represent separate operations that are executed in addition to the operations of the replication process.

As shown in FIG. 7A, the source entity executes a sampling process that includes obtaining, from the source dataset, a source data sample corresponding to source data previously transmitted to a destination entity for replication of the source dataset (Operation 704). The source entity may include a sampling module. The source entity may obtain the source data sample based on one or more sampling protocols. The source entity may obtain the source data sample in response to a control event. The control event may include metadata that specifies one or more parameters of a sampling protocol, such as a dataset for obtaining the sample data, how to select the sample data, and/or a quantity of sample data to obtain. The source entity may map the control event to predefined rules or conditions corresponding to the sampling protocol, and obtain samples according to the predefined rules or conditions. Example sampling protocols are described above with reference to subsection B of section 4, titled “Example Sampling Protocols.”

After obtaining a source data sample, the source entity generates a source-entity control message that includes the source data sample (Operation 706). The term “source-entity control message” refers to a control message generated at least in part by a source entity and/or originating at least in part from the source entity. The source entity may generate the control message itself and/or the source entity may send a request to a different entity to generate the control message. The source entity generates the control message according to a protocol and/or system requirements that specify a structure and content of the control message. The source entity adds the source data sample to the control message and formats the control message according to the protocol and/or system requirements. The control message may be formatted according to predefined message schema, including headers, payloads, and metadata, such as timestamps and/or sequence numbers. The source entity encodes the control message into a specified transmission format, such as binary, JSON, XML. Additionally, or alternatively, the source entity may apply a checksum and/or a cryptographic signature to the control message for use in validating and authenticating the control message.

After generating the source-entity control message, the source entity transmits the source-entity control message to the destination entity (Operation 708). Transmission of the control message to the destination entity may be handled at least in part by the source entity and/or at least in part by one or more other computing entities of the system. The control message may be transmitted to the destination entity via a replication stream utilized to transmit data messages for replicating data in accordance with a replication process. To transmit the control message, the source entity may put the control message in a queue for transmission through a designated communication interface or transport layer that handles routing to the destination entity. The system may pass the control message from the queue to a communication interface, such as a network interface card (NIC) or an inter-process communication (IPC) channel. The system may encapsulate the control message according to a protocol-specific protocol data unit. The protocol data unit may include addressing information, protocol identifiers, and error-detection codes. The system may segment the encapsulated control message into packets if the encapsulated control message exceeds a maximum transmission unit (MTU) of the communication channel. The system schedules transmission of the encapsulated control message or packets to the destination entity via the communication channel based on network or channel availability.

When the destination entity receives the packets, the destination entity reassembles the packets into the original control message. Transmission of the control message may involve multiple intermediate hops, such as routers or switches, that forward the control message based on routing or addressing information. The destination entity receives the source-entity control message and executes a verification process based on the source data sample in the control message to verify consistency between a destination dataset and the source data sample. Operations of the destination entity associated with source-entity control messages received from a source entity are further described below with reference to FIG. 7B.

After transmitting the source-entity control message to the destination entity, the source entity receives a destination-entity control message that includes an indication with respect to the verification process executed by the destination entity based on the source data sample (Operation 710). As used herein, the term "destination-entity control message" refers to a control message generated at least in part by a destination entity and/or originating at least in part from the destination entity. The destination entity may generate the control message itself and/or the destination entity may send a request to a different entity to generate the control message.

The source entity and/or another computing entity of the system may process the destination-entity control message. Processing of the control message may include reassembling the control message from a set of packets and/or decoding the control message, for example, into a PDU format. After decoding, the source entity may parse the destination-entity control message according to an decoding mechanism, for example, to identify and separate the headers, payload, and trailers. The parsing process may include identifying the control message and/or determining the content of the control message, for example by extracting fields based on predefined schema, such as field identifiers, tags, flags, offsets, lengths, and/or data types. The source entity utilizes a decoding mechanism to identify the control message and extract content from the control message based on the predefined schema.

After receiving the destination-entity control message, the source entity determines whether the destination-entity control message indicates that the destination dataset is consistent with the source data sample (Operation 712). The source entity may determine whether the control message indicates that the destination dataset is consistent with the source data sample based on the content of the control message. The source entity may reference field identifiers or tags based on schema of the control message. Based on the field identifiers or tags, the source entity may identify content of the control message that indicates whether the destination dataset is consistent with the source data sample. In one example, the control message includes a flag that indicates whether the destination dataset is consistent with the source data sample. The source entity may interpret meaning based on specified semantics of the flag. For example, a flag may include a value of "1" to indicate that the destination dataset is consistent with the source data sample and/or a value of "0" to indicate that the destination dataset is inconsistent with the source data sample.

When the source entity determines, based at least in part on the destination-entity control message, that the destination dataset is consistent with the source data sample, the source entity classifies the destination dataset as being consistent with the source dataset (Operation 714). Additionally, or alternatively, when the source entity determines, based at least in part on the destination-entity control message, that the destination dataset is inconsistent with the source data sample, the source entity classifies the destination dataset as being inconsistent with the source dataset (Operation 716). The source entity may classify the destination dataset as being consistent or inconsistent with the source dataset by executing an update to metadata associated with the source dataset. The source entity may access a metadata file in a data repository. The source entity may identify a schema or structure associated with the metadata that defines one or more fields and/or formats for storing metadata. The source entity may classify the destination dataset by appending a new entry to the metadata and/or by modifying an existing entry.

In one example, when the source entity determines that the destination dataset is inconsistent with the source data sample, the source entity initiates execution of a remediation operation to remediate one or more inconsistencies between the destination dataset and the source dataset (Operation 718). The source entity may select a function or module for initiating execution of the remediation operation from a mapping, such as from a function table or dispatch mechanism. After selecting the function or module, the source entity may invoke the function or module using a method call, an IPC, or a task scheduling mechanism. The method call may pass arguments to the function or module that cause the function or module to execute the remediation operation. Example remediation operations are described above with reference to FIG. 6.

Referring to FIG. 7B, operations of a destination entity pertaining to verifying consistency between a destination dataset and a source dataset based on a source data sample are further described. As shown in FIG. 7B, the destination entity receives a source-entity control message from the source entity (Operation 720). The source-entity control message includes a source data sample with one or more sample source records from a source dataset.

The destination entity and/or another computing entity of the system may process the source-entity control message. Processing of the control message may include reassembling the control message from a set of packets and/or decoding the control message, for example, into a PDU format. After decoding, the destination entity may parse the source-entity control message according to the protocol specification, for example, to identify and separate the headers, payload, and trailers. The parsing process may include extracting fields based on predefined schema, such as field identifiers, tags, flags, offsets, lengths, and/or data types. Based on the predefined schema, the destination entity may determine that the control message includes a source data sample for comparison to a destination dataset. Additionally, or alternatively, the destination entity may determine, based on the predefined schema, the destination dataset for comparison to the source data sample and/or the relevant portion of the destination dataset for comparison to the source data sample.

In response to receiving the source-entity control message, the destination entity executes a verification process that includes comparing the source data sample to the destination dataset (Operation 722). The destination entity compares the source data sample to the destination dataset to verify consistency between the destination dataset and the source data sample. To compare the source data sample to the destination dataset, the destination entity may identify and access the destination dataset and/or the relevant portion of the destination dataset, for example, based on the predefined schema of the control message that includes the source data sample. Upon accessing the relevant portion of the destination dataset, the destination entity compares the relevant portion of the destination dataset to the source data sample. The destination entity may perform the comparison by applying one or more comparison algorithms.

The one or more comparison algorithms may include one or more of the following: checksum validation, row-by-row comparison, hash-based comparison, schema validation, value range validation, record count comparison, set difference operations, or key integrity validation. Checksum validation includes computing a source checksum for the source data sample and a destination checksum for the relevant portion of the destination dataset and comparing the checksums to determine whether the checksums are consistent. Row-by-row comparison includes comparing individual rows of the destination dataset to the source data sample based on predefined keys to identify mismatches in values or structures. Hash-based comparison includes utilizing cryptographic or non-cryptographic hash functions to generate hash values for the source data sample and the relevant portion of the destination dataset and comparing the hash values to determine whether the hash values are consistent. Schema validation includes ensuring that the destination dataset and the source data sample adhere to the same schema, including, for example, consistency in data types, column names, and structural definitions. Value range validation includes verifying that numerical or categorical data values of the destination dataset fall within expected ranges corresponding to the source data sample. Record count comparison includes comparing the total number of records of the source data sample to the total number of records in the relevant portion of the destination dataset to identify discrepancies in dataset sizes. Set difference operations includes determining whether elements present in the source data sample are also present in the relevant portion of the destination dataset, for example, using set-theoretic operations. Key integrity validation includes ensuring that primary and foreign key constraints are consistent between the source data sample and the relevant portion of the destination dataset.

After executing the one or more comparison algorithms, the destination entity determines, based on the one or more comparison algorithms, whether the destination dataset is consistent with the source data sample (Operation 724). The destination entity may determine that the destination dataset is consistent with the source data sample when the results of the one or more comparison algorithms indicate an absence of mismatches between the source data sample and the relevant portion of the destination dataset. The destination entity may determine that the destination dataset is inconsistent with the source data sample when the results of at least one comparison algorithms indicate a mismatch between the source data sample and the relevant portion of the destination dataset.

When the destination entity determines, based at least in part on the verification process, that the destination dataset is consistent with the source data sample, the destination entity classifies the destination dataset as being consistent with the source dataset (Operation 726). Additionally, or alternatively, when the destination entity determines that the destination dataset is inconsistent with the source data sample, the destination entity classifies the destination dataset as being inconsistent with the source dataset (Operation 728).

The destination entity may classify the destination dataset as being consistent or inconsistent with the source dataset by executing an update to metadata associated with the destination dataset. The destination entity may access a metadata file in a data repository. The destination entity may identify a schema or structure associated with the metadata that defines one or more fields and/or formats for storing metadata. The destination entity may classify the destination dataset by appending a new entry to the metadata and/or by modifying an existing entry.

After classifying the destination dataset as being consistent or inconsistent with the source dataset, the destination entity generates a destination-entity control message that includes an indication with respect to the classification of the destination dataset based on the verification process (Operation 730). The destination entity may generate the control message itself, and/or the destination entity may send a request to a different entity to generate the control message. The destination entity generates the control message according to a protocol and/or system requirements that specify a structure and content of the control message. The destination entity adds the indication with respect to the classification of the destination dataset to the control message and formats the control message according to the protocol and/or system requirements. The control message may be formatted according to predefined message schema, including headers, payloads, and metadata, such as timestamps and/or sequence numbers. The destination entity encodes the control message into a specified transmission format, such as binary, JSON, XML. Additionally, or alternatively, the destination entity may apply a checksum and/or a cryptographic signature to the control message for use in validating and authenticating the control message.

After generating the destination-entity control message, the destination entity transmits the control message to the source entity (Operation 732). Transmission of the control message to the source entity may be handled at least in part by the destination entity and/or at least in part by one or more other computing entities of the system. The control message may be transmitted to the destination entity via a replication stream utilized to transmit data messages for replicating data in accordance with a replication process. To transmit the control message, the destination entity may put the control message in a queue for transmission through a designated communication interface or transport layer that handles routing to the source entity. The system may pass the control message from the queue to a communication interface, such as a NIC or an IPC channel. The system may encapsulate the control message according to a protocol-specific protocol data unit. The protocol data unit may include addressing information, protocol identifiers, and error-detection codes. The system may segment the encapsulated control message into packets if the encapsulated control message exceeds an MTU of the communication channel. The system schedules transmission of the encapsulated control message or packets to the source entity via the communication channel based on network or channel availability.

In one example, when the destination entity determines that the destination dataset is inconsistent with the source data sample, the destination entity initiates execution of a remediation operation to remediate one or more inconsistencies (Operation 734). The destination entity may select a function or module for initiating execution of the remediation operation from a mapping, such as from a function table or dispatch mechanism. After selecting the function or module, the destination entity may invoke the function or module using a method call, an IPC, or a task scheduling mechanism. The method call may pass arguments to the function or module that cause the function or module to execute the remediation operation. Example remediation operations are described above with reference to FIG. 6.

B. Verifying Consistency Based on Destination Data Samples

Figure 7C:
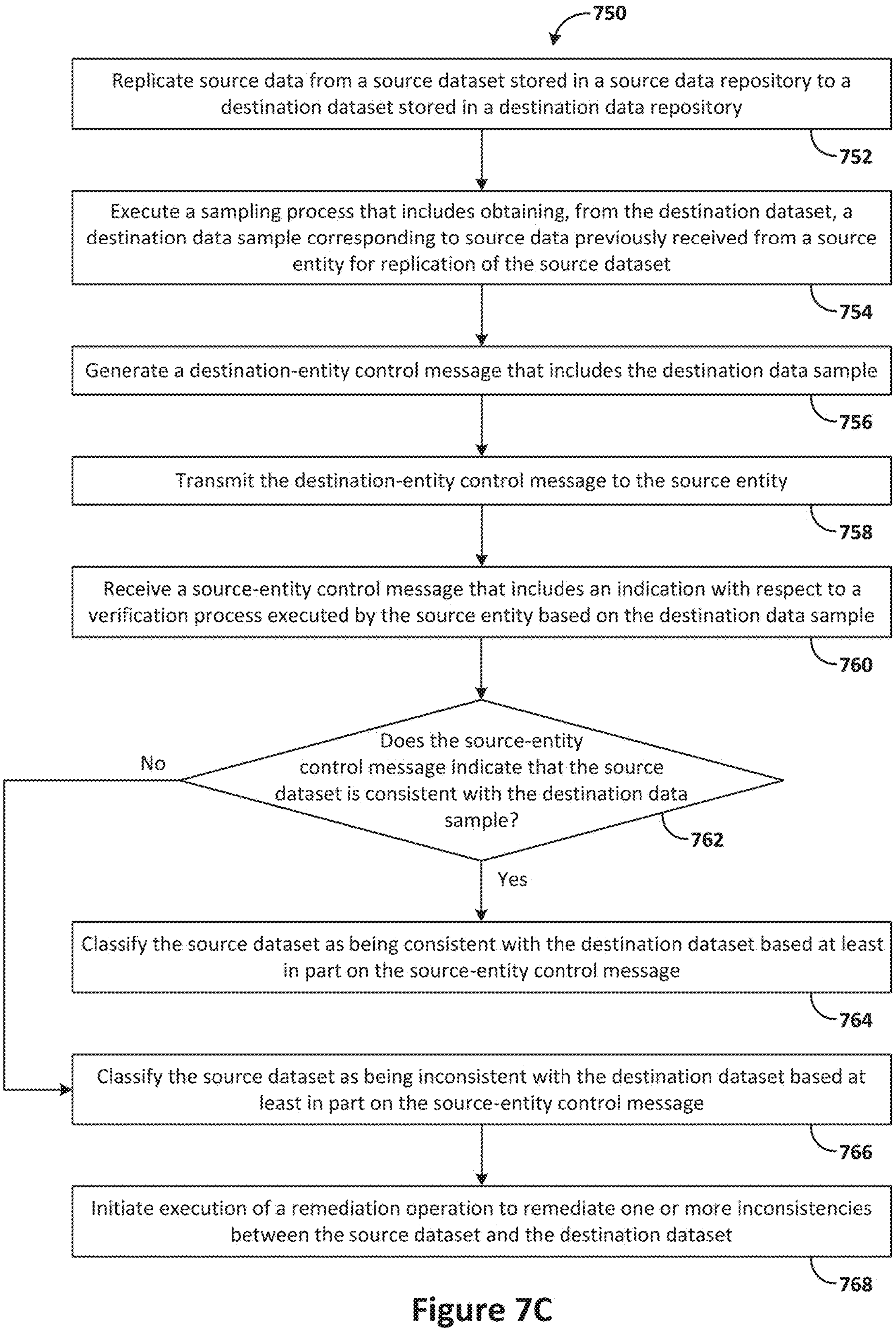
Figure 7D:
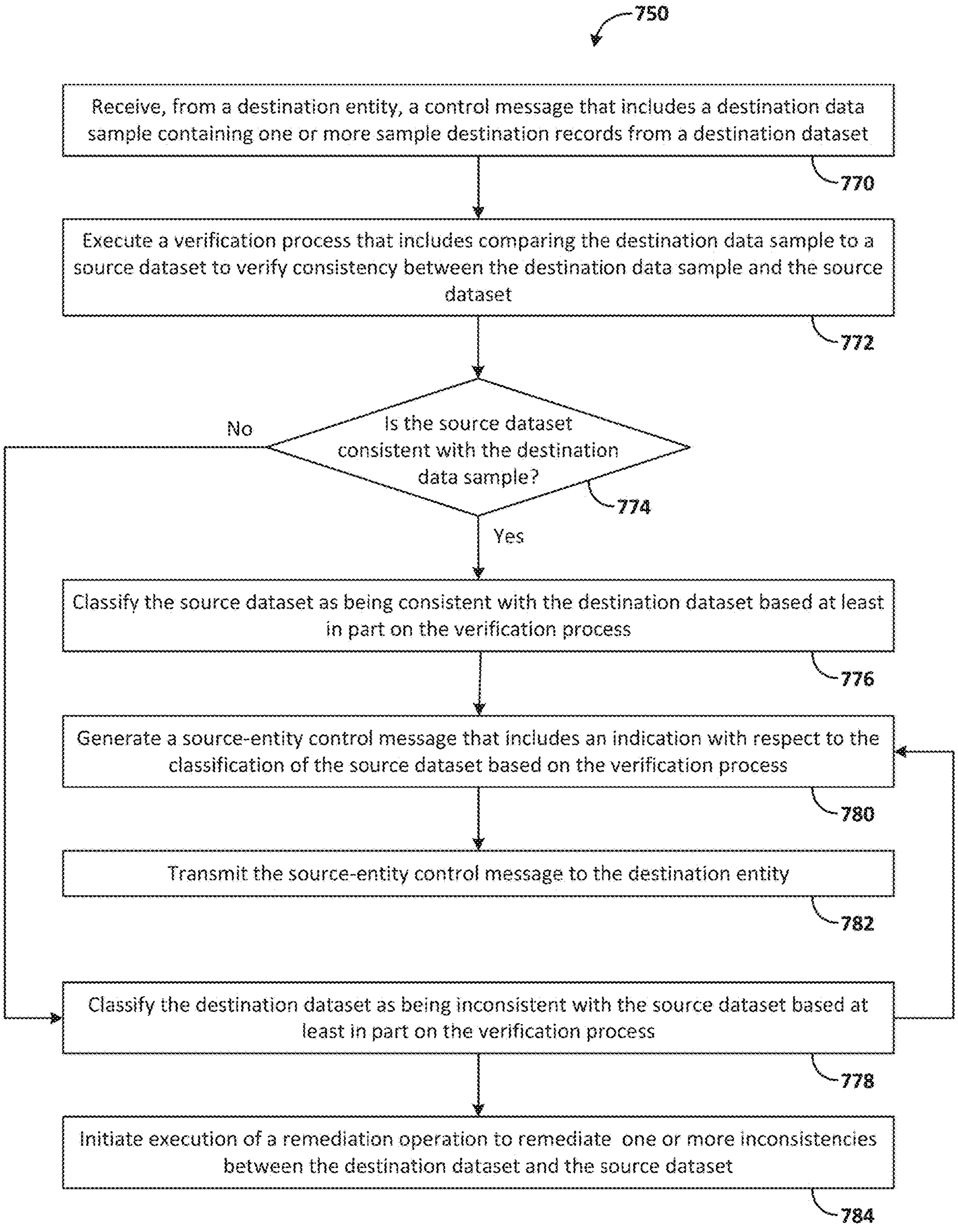

Referring to FIGS. 7C and 7D, operations 750 pertaining to verifying consistency between a source dataset and a destination dataset based on a destination data sample are further described. As described with reference to FIG. 7C, a destination entity may transmit a control message to a source entity that includes a destination data sample. As described with reference to FIG. 7D, the source entity may verify consistency between the source dataset and the destination dataset based on the destination data sample.

As shown in FIG. 7C, the system replicates source data from a source dataset stored in a source data repository to a destination dataset stored in a destination data repository (Operation 752). The system may replicate the source data by executing a replication process. The replication process may include a destination entity receiving data messages from a source entity that represent changes to the source dataset. The destination entity may update the destination dataset based on the changes in the data messages to update the state of the destination dataset to match the state of the source dataset. Further operations pertaining to replication processes are described above with reference to operation 702 of FIG. 7A. The operations described herein pertaining to verifying consistency between a destination dataset and a source dataset based on a destination data sample may be utilized as part of the replication process, for example, as part of a synchronization process. Additionally, or alternatively, the operations described herein pertaining to verifying consistency between a destination dataset and a source dataset based on a destination data sample may represent separate operations that are executed in addition to the operations of the replication process.

As shown in FIG. 7C, the destination entity executes a sampling process that includes obtaining, from the destination dataset, a destination data sample corresponding to source data previously received from a source entity for replication of the source dataset (Operation 754). The destination entity may include a sampling module. The destination entity may obtain the destination data sample based on one or more sampling protocols. The destination entity may obtain the destination data sample in response to a control event. The control event may include metadata that specifies one or more parameters of a sampling protocol, such as a dataset for obtaining the sample data, how to select the sample data, and/or a quantity of sample data to obtain. The destination entity may map the control event to predefined rules or conditions corresponding to the sampling protocol, and obtain samples according to the predefined rules or conditions. Example sampling protocols are described above with reference to subsection B of section 4, titled “Example Sampling Protocols.”

After obtaining a destination data sample, the destination entity generates a destination-entity control message that includes the destination data sample (Operation 756). The destination entity may generate the control message itself, and/or the destination entity may send a request to a different entity to generate the control message. The destination entity generates the control message according to a protocol and/or system requirements that specify a structure and content of the control message. The destination entity adds the destination data sample to the control message and formats the control message according to the protocol and/or system requirements. The control message may be formatted according to predefined message schema, including headers, payloads, and metadata, such as timestamps and/or sequence numbers. The destination entity encodes the control message into a specified transmission format, such as binary, JSON, XML. Additionally, or alternatively, the destination entity may apply a checksum and/or a cryptographic signature to the control message for use in validating and authenticating the control message.

After generating the destination-entity control message, the destination entity transmits the destination-entity control message to the source entity (Operation 758). Transmission of the control message to the source entity may be handled at least in part by the destination entity and/or at least in part by one or more other computing entities of the system. The control message may be transmitted to the source entity via a replication stream utilized to transmit data messages for replicating data in accordance with a replication process. To transmit the control message, the destination entity may put the control message in a queue for transmission through a designated communication interface or transport layer that handles routing to the source entity. The system may pass the control message from the queue to a communication interface, such as a NIC or an IPC channel. The system may encapsulate the control message according to a protocol-specific protocol data unit. The protocol data unit may include addressing information, protocol identifiers, and error-detection codes. The system may segment the encapsulated control message into packets if the encapsulated control message exceeds an MTU of the communication channel. The system schedules transmission of the encapsulated control message or packets to the source entity via the communication channel based on network or channel availability.

When the source entity receives the packets, the source entity reassembles the packets into the original control message. Transmission of the control message may involve multiple intermediate hops, such as routers or switches, that forward the control message based on routing or addressing information. The source entity receives the destination-entity control message and executes a verification process based on the destination data sample in the control message to verify consistency between a source dataset and the destination data sample. Operations of the source entity associated with destination-entity control messages received from a destination entity are further described below with reference to FIG. 7D.

After transmitting the destination-entity control message to the source entity, the destination entity receives a source-entity control message that includes an indication with respect to a verification process executed by the source entity based on the destination data sample (Operation 760). The source entity may generate the control message itself and/or the source entity may send a request to a different entity to generate the control message. The destination entity and/or another computing entity of the system may process the source-entity control message. Processing of the control message may include reassembling the control message from a set of packets and/or decoding the control message, for example, into a PDU format. After decoding, the destination entity may parse the source-entity control message according to a decoding mechanism, for example, to identify and separate the headers, payload, and trailers. The parsing process may include identifying the control message and/or determining the content of the control message, for example by extracting fields based on predefined schema, such as field identifiers, tags, flags, offsets, lengths, and/or data types. The destination entity utilizes a decoding mechanism to identify the control message and extract content from the control message based on the predefined schema.

After receiving the source-entity control message, the destination entity determines whether the source-entity control message indicates that the source dataset is consistent with the destination data sample (Operation 762). The destination entity may determine whether the control message indicates that the source dataset is consistent with the destination data sample based on the content of the control message. The destination entity may reference field identifiers or tags based on schema of the control message. Based on the field identifiers or tags, the destination entity may identify content of the control message that indicates whether the source dataset is consistent with the destination data sample. In one example, the control message includes a flag that indicates whether the source dataset is consistent with the destination data sample. The destination entity may interpret meaning based on specified semantics of the flag. For example, a flag fiend may include a value of "1" to indicate that the source dataset is consistent with the destination data sample and/or a value of "0" to indicate that the source dataset is inconsistent with the destination data sample.

When the destination entity determines, based at least in part on the source-entity control message, that the source dataset is consistent with the destination data sample, the destination entity classifies the source dataset as being consistent with the destination dataset (Operation 764). Additionally, or alternatively, when the destination entity determines, based at least in part on the source-entity control message, that the source dataset is inconsistent with the destination data sample, the destination entity classifies the source dataset as being inconsistent with the destination dataset (Operation 766). The destination entity may classify the source dataset as being consistent or inconsistent with the destination dataset by executing an update to metadata associated with the destination dataset. The destination entity may access a metadata file in a data repository. The destination entity may identify a schema or structure associated with the metadata that defines one or more fields and/or formats for storing metadata. The destination entity may classify the source dataset by appending a new entry to the metadata and/or by modifying an existing entry.

In one example, when the destination entity determines that the source dataset is inconsistent with the destination data sample, the destination entity initiates execution of a remediation operation to remediate one or more inconsistencies between the source dataset and the destination dataset (Operation 768). The destination entity may select a function or module for initiating execution of the remediation operation from a mapping, such as from a function table or dispatch mechanism. After selecting the function or module, the destination entity may invoke the function or module using a method call, an IPC, or a task scheduling mechanism. The method call may pass arguments to the function or module that cause the function or module to execute the remediation operation. Example remediation operations are described above with reference to FIG. 6.

Referring to FIG. 7D, operations of a source entity pertaining to verifying consistency between a source dataset and a destination dataset based on a destination data sample are further described. As shown in FIG. 7D, the source entity receives a destination-entity control message from a destination entity (Operation 770). The destination-entity control message includes a destination data sample with one or more sample destination records from a destination dataset.

The source entity and/or another computing entity of the system may process the destination-entity control message. Processing of the control message may include reassembling the control message from a set of packets and/or decoding the control message, for example, into a PDU format. After decoding, the source entity may parse the destination-entity control message according to the protocol specification, for example, to identify and separate the headers, payload, and trailers. The parsing process may include extracting fields based on predefined schema, such as field identifiers, tags, flags, offsets, lengths, and/or data types. Based on the predefined schema, the source entity may determine that the control message includes a destination data sample for comparison to a source dataset. Additionally, or alternatively, the source entity may determine, based on the predefined schema, the source dataset for comparison to the destination data sample and/or the relevant portion of the source dataset for comparison to the destination data sample.

In response to receiving the destination-entity control message, the source entity executes a verification process that includes comparing the destination data sample to a source dataset (Operation 772). The source entity compares the destination data sample to the source dataset to verify consistency between the destination data sample and the source dataset. To compare the destination data sample to the source dataset, the source entity may identify and access the source dataset and/or the relevant portion of the source dataset, for example, based on the predefined schema of the control message that includes the destination data sample. Upon accessing the relevant portion of the source dataset, the source entity compares the relevant portion of the source dataset to the destination data sample. The source entity may perform the comparison by applying one or more comparison algorithms, such as one or more of the following: checksum validation, row-by-row comparison, hash-based comparison, schema validation, value range validation, record count comparison, set difference operations, or key integrity validation. Example comparison algorithms are further described above with reference to operation 722 of FIG. 7B.

After executing the one or more comparison algorithms, the source entity determines, based on the one or more comparison algorithms, whether the source dataset is consistent with the destination data sample (Operation 774). The source entity may determine that the source dataset is consistent with the destination data sample when the results of the one or more comparison algorithms indicate an absence of mismatches between the destination data sample and the relevant portion of the source dataset. The source entity may determine that the source dataset is inconsistent with the destination data sample when the results of at least one comparison algorithms indicates a mismatch between the destination data sample and the relevant portion of the source dataset.

When the source entity determines, based at least in part on the verification process, that the source dataset is consistent with the destination data sample, the source entity classifies the source dataset as being consistent with the destination dataset (Operation 776). Additionally, or alternatively, when the source entity determines that the source dataset is inconsistent with the destination data sample, the source entity classifies the destination dataset as being inconsistent with the source dataset (Operation 778).

The source entity may classify the source dataset as being consistent or inconsistent with the destination dataset by executing an update to metadata associated with the source dataset. The source entity may access a metadata file in a data repository. The source entity may identify a schema or structure associated with the metadata that defines one or more fields and/or formats for storing metadata. The source entity may classify the source dataset by appending a new entry to the metadata and/or by modifying an existing entry.

After classifying the source dataset as being consistent or inconsistent with the destination dataset, the source entity generates a source-entity control message that includes an indication with respect to the classification of the source dataset based on the verification process (Operation 780). The source entity may generate the control message itself, and/or the source entity may send a request to a different entity to generate the control message. The source entity generates the control message according to a protocol and/or system requirements that specify a structure and content of the control message. The source entity adds the indication with respect to the classification of the source dataset to the control message and formats the control message according to the protocol and/or system requirements. The control message may be formatted according to predefined message schema, including headers, payloads, and metadata, such as timestamps and/or sequence numbers. The source entity encodes the control message into a specified transmission format, such as binary, JSON, XML. Additionally, or alternatively, the source entity may apply a checksum and/or a cryptographic signature to the control message for use in validating and authenticating the control message.

After generating the source-entity control message, the source entity transmits the source-entity control message to the destination entity (Operation 782). Transmission of the control message to the destination entity may be handled at least in part by the source entity and/or at least in part by one or more other computing entities of the system. The control message may be transmitted to the destination entity via a replication stream utilized to transmit data messages for replicating data in accordance with a replication process. To transmit the control message, the source entity may put the control message in a queue for transmission through a designated communication interface or transport layer that handles routing to the source entity. The system may pass the control message from the queue to a communication interface, such as a NIC or an IPC channel. The system may encapsulate the control message according to a protocol-specific protocol data unit. The protocol data unit may include addressing information, protocol identifiers, and error-detection codes. The system may segment the encapsulated control message into packets if the encapsulated control message exceeds an MTU of the communication channel. The system schedules transmission of the encapsulated control message or packets to the source entity via the communication channel based on network or channel availability.

In one example, when the source entity determines that the source dataset is inconsistent with the destination data sample, the source entity initiates execution of a remediation operation to remediate one or more inconsistencies between the source dataset and the destination dataset (Operation 784). The source entity may select a function or module for initiating execution of the remediation operation from a mapping, such as from a function table or dispatch mechanism. After selecting the function or module, the source entity may invoke the function or module using a method call, an IPC, or a task scheduling mechanism. The method call may pass arguments to the function or module that cause the function or module to execute the remediation operation. Example remediation operations are described above with reference to FIG. 6.

C. Preparing Replicated Datasets for Use In A Computing Environment

Figure 8:
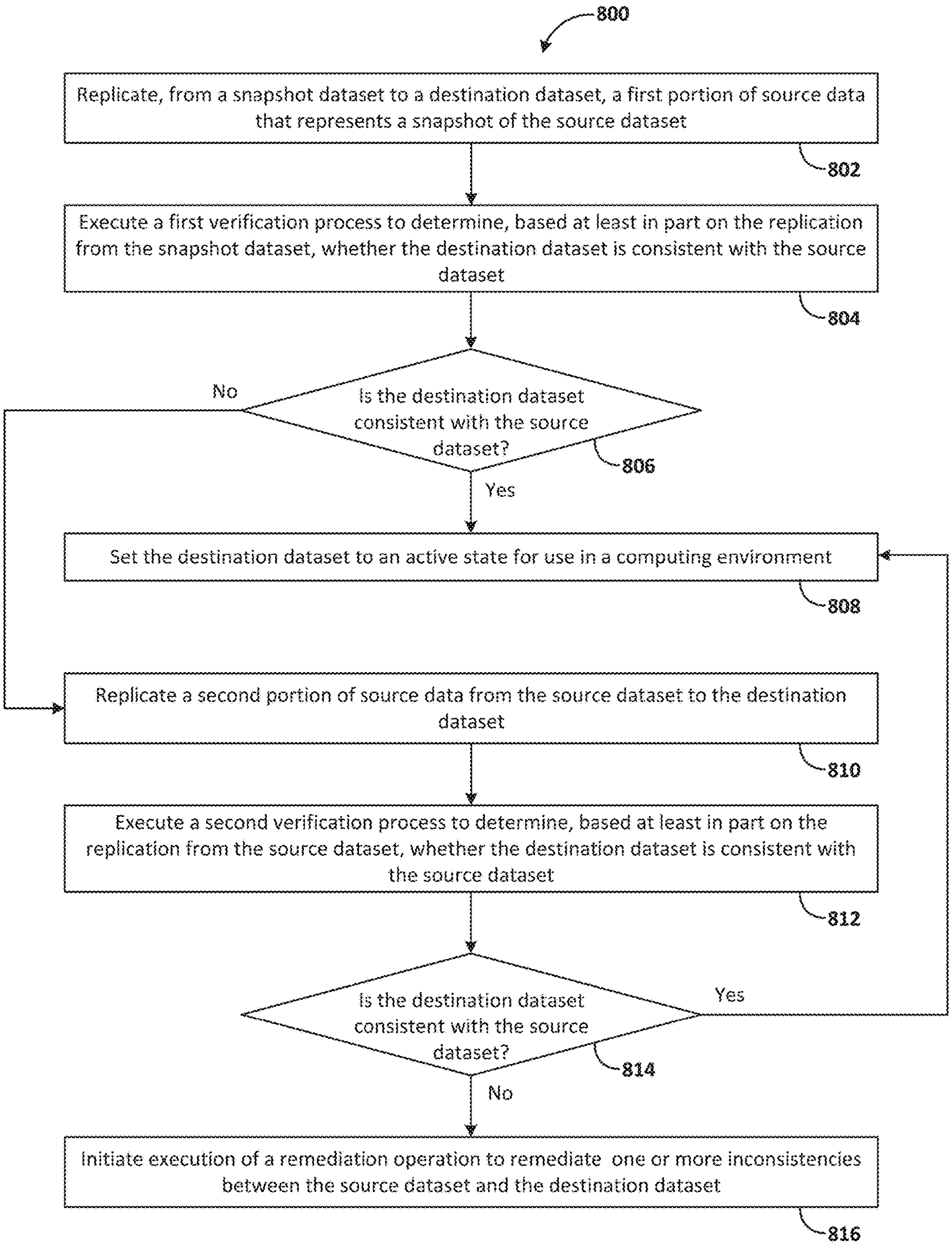
FIG. 8 is a flowchart that depicts example operations pertaining to replicating data and verifying consistency between datasets in connection with preparing a dataset for use in a computing environment in accordance with one or more embodiments.

Referring to FIG. 8, operations 800 pertaining to preparing replicated datasets for use in a computing environment are further described. The operations described with reference to FIG. 8 may include, and/or may be executed in connection with, one or more operations described with reference to FIG. 7A-7D. As shown in FIG. 8, a system replicates, from a snapshot dataset to a destination dataset, a first portion of source data that represents a snapshot of the source dataset (Operation 802). Example operations pertaining to replication processes are described above with reference to operation 702 of FIG. 7A and operation 752 of FIG. 7C.

After replicating the first portion of the source data from the snapshot dataset, the system executes a first verification process to determine, based at least in part on the replication from the snapshot dataset, whether the destination dataset is consistent with the source dataset (Operation 804). The system may execute the first verification process based on a source data sample obtained from a source dataset and/or based on a destination data sample from the destination dataset. When the verification process is based on a source data sample obtained from the source dataset, the system may execute one or more operations described above with reference to FIGS. 7A and 7B. When the verification process is based on a destination data sample obtained from the destination dataset, the system may execute one or more operations described above with reference to FIGS. 7C and 7D.

After executing the first verification process, the system determines, based on the verification process, whether the destination dataset is consistent with the source dataset (Operation 806). In one example, the destination dataset is consistent with the source dataset when the snapshot dataset, utilized to replicate the first portion of source data to the destination dataset, is consistent with the source dataset. When the system determines that the destination dataset is consistent with the source dataset, the system sets the destination dataset to an active state for use in a computing environment (Operation 808).

The system may set the destination dataset to an active state by updating metadata associated with the destination dataset. In one example, the metadata includes a flag that indicates whether the destination dataset has an active state or an inactive state. The active state indicates that the destination dataset is available for use in the computing environment. Additionally, or alternatively, the system may update an internal system state to reflect that the destination dataset is active. The system may update the internal system state to make the destination dataset available for use. The update to the internal system state may include an update to internal data structures, system configurations, access control mechanisms, and/or system flags. The update to the internal system state may enable computing entities to recognize the destination dataset as active and available for use. In a distributed state system, the update to the internal system state may include updating state information that is synchronized across multiple nodes of the distributed state system. Additionally, or alternatively, the system may update indexing or caching mechanisms to ensure efficient access to the destination dataset.

Additionally, or alternatively, when the system determines that the destination dataset is inconsistent with the source dataset, the system replicates a second portion of source data from the source dataset to the destination dataset (Operation 810). The system may select the second portion of source data based on the inconsistency. The inconsistency between the destination dataset and the source dataset may be attributable at least in part to a difference between the snapshot dataset and the source dataset. The second portion of source data may remediate the difference between the snapshot dataset and the source dataset. Example operations pertaining to replication processes are described above with reference to operation 702 of FIG. 7A and operation 752 of FIG. 7C.

After replicating the second portion of the source data from the source dataset, the system executes a second verification process to determine, based at least in part on the replication from the source dataset, whether the destination dataset is consistent with the source dataset (Operation 812). The system may execute the second verification process based on a source data sample obtained from the source dataset and/or based on a destination data sample from the destination dataset. When the verification process is based on a source data sample obtained from the source dataset, the system may execute one or more operations described above with reference to FIGS. 7A and 7B. When the verification process is based on a destination data sample obtained from the destination dataset, the system may execute one or more operations described above with reference to FIGS. 7C and 7D.

After executing the second verification process, the system determines, based on the verification process, whether the destination dataset is consistent with the source dataset (Operation 814). When the system determines that the destination dataset is consistent with the source dataset, the system sets the destination dataset to an active state for use in a computing environment (Operation 808). When the system determines that the destination dataset is inconsistent with the source dataset, the system initiates execution of a remediation operation to remediate one or more inconsistencies between the source dataset and the destination dataset (Operation 816). The system may select a function or module for initiating execution of the remediation operation, for example, as described above with reference to operation 718 of FIG. 7A. Example remediation operations are described above with reference to FIG. 6.

6. Example Machine Learning System

A. Example Architecture of A Machine Learning System

Figure 9:
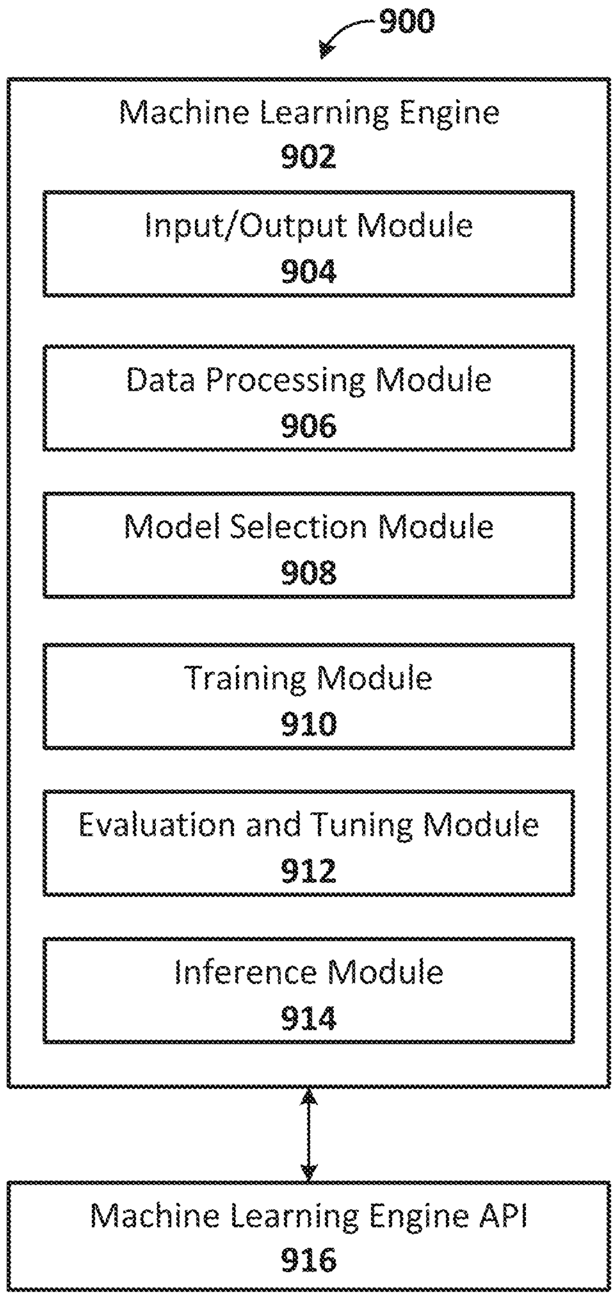
FIG. 9 illustrates features of an example machine learning system in accordance with one or more embodiments.

FIG. 9 illustrates an example architecture of a machine learning system 900. The machine learning system 900 includes a machine learning engine 902 in accordance with one or more embodiments. As illustrated in FIG. 9, machine learning engine 902 includes input/output module 904, data preprocessing module 906, model selection module 908, training module 910, evaluation and tuning module 912, and inference module 914.

In accordance with an embodiment, input/output module 904 serves as the primary interface for data entering and exiting the system, managing the flow and integrity of data. This module may accommodate a wide range of data sources and formats to facilitate integration and communication within the machine learning architecture.

In an embodiment, an input handler within input/output module 904 includes a data ingestion framework capable of interfacing with various data sources, such as databases, APIs, file systems, and real-time data streams. This framework is equipped with functionalities to handle different data formats (e.g., CSV, JSON, XML) and efficiently manage large volumes of data. It includes mechanisms for batch and real-time data processing that enable the input/output module 904 to be versatile in different operational contexts, whether processing historical datasets or streaming data.

In accordance with an embodiment, input/output module 904 manages data integrity and quality as it enters the system by incorporating initial checks and validations. These checks and validations ensure that incoming data meets predefined quality standards, like checking for missing values, ensuring consistency in data formats, and verifying data ranges and types. This proactive approach to data quality minimizes potential errors and inconsistencies in later stages of the machine learning process.

In an embodiment, an output handler within input/output module 904 includes an output framework designed to handle the distribution and exportation of outputs, predictions, or insights. Using the output framework, input/output module 904 formats these outputs into user-friendly and accessible formats, such as reports, visualizations, or data files compatible with other systems. Input/output module 904 also ensures secure and efficient transmission of these outputs to end-users or other systems in an embodiment and may employ encryption and secure data transfer protocols to maintain data confidentiality.

In accordance with an embodiment, data preprocessing module 906 transforms data into a format suitable for use by other modules in machine learning engine 902. For example, data preprocessing module 906 may transform raw data into a normalized or standardized format suitable for training ML models and for processing new data inputs for inference. In an embodiment, data preprocessing module 906 acts as a bridge between the raw data sources and the analytical capabilities of machine learning engine 902.

In an embodiment, data preprocessing module 906 begins by implementing a series of preprocessing steps to clean, normalize, and/or standardize the data. This involves handling a variety of anomalies, such as managing unexpected data elements, recognizing inconsistencies, or dealing with missing values. Some of these anomalies can be addressed through methods like imputation or removal of incomplete records, depending on the nature and volume of the missing data. Data preprocessing module 906 may be configured to handle anomalies in different ways depending on context. Data preprocessing module 906 also handles the normalization of numerical data in preparation for use with models sensitive to the scale of the data, like neural networks and distance-based algorithms. Normalization techniques, such as min-max scaling or z-score standardization, may be applied to bring numerical features to a common scale, enhancing the model's ability to learn effectively.

In an embodiment, data preprocessing module 906 includes a feature encoding framework that ensures categorical variables are transformed into a format that can be easily interpreted by machine learning algorithms. Techniques like one-hot encoding or label encoding may be employed to convert categorical data into numerical values, making them suitable for analysis. The module may also include feature selection mechanisms, where redundant or irrelevant features are identified and removed, thereby increasing the efficiency and performance of the model.

In accordance with an embodiment, when data preprocessing module 906 processes new data for inference, data preprocessing module 906 replicates the same preprocessing steps to ensure consistency with the training data format. This helps to avoid discrepancies between the training data format and the inference data format, thereby reducing the likelihood of inaccurate or invalid model predictions.

In an embodiment, model selection module 908 includes logic for determining the most suitable algorithm or model architecture for a given dataset and problem. This module operates in part by analyzing the characteristics of the input data, such as its dimensionality, distribution, and the type of problem (classification, regression, clustering, etc.).

In an embodiment, model selection module 908 employs a variety of statistical and analytical techniques to understand data patterns, identify potential correlations, and assess the complexity of the task. Based on this analysis, it then matches the data characteristics with the strengths and weaknesses of various available models. This can range from simple linear models for less complex problems to sophisticated deep learning architectures for tasks requiring feature extraction and high-level pattern recognition, such as image and speech recognition.

In an embodiment, model selection module 908 utilizes techniques from the field of Automated Machine Learning (AutoML). AutoML systems automate the process of model selection by rapidly prototyping and evaluating multiple models. They use techniques like Bayesian optimization, genetic algorithms, or reinforcement learning to explore the model space efficiently. Model selection module 908 may use these techniques to evaluate each candidate model based on performance metrics relevant to the task. For example, accuracy, precision, recall, or F1 score may be used for classification tasks and mean squared error metrics may be used for regression tasks. Accuracy measures the proportion of correct predictions (both positive and negative). Precision measures the proportion of actual positives among the predicted positive cases. Recall (also known as sensitivity) evaluates how well the model identifies actual positives. F1 Score is a single metric that accounts for both false positives and false negatives. The mean squared error (MSE) metric may be used for regression tasks. MSE measures the average squared difference between the actual and predicted values, providing an indication of the model's accuracy. A lower MSE may indicate a model's greater accuracy in predicting values, as it represents a smaller average discrepancy between the actual and predicted values.

In accordance with an embodiment, model selection module 908 also considers computational efficiency and resource constraints. This is meant to help ensure the selected model is both accurate and practical in terms of computational and time requirements. In an embodiment, certain features of model selection module 908 are configurable such as a configured bias toward (or against) computational efficiency.

In accordance with an embodiment, training module 910 manages the 'learning' process of ML models by implementing various learning algorithms that enable models to identify patterns and make predictions or decisions based on input data. In an embodiment, the training process begins with the preparation of the dataset after preprocessing; this involves splitting the data into training and validation sets. The training set is used to teach the model, while the validation set is used to evaluate its performance and adjust parameters accordingly. Training module 910 handles the iterative process of feeding the training data into the model, adjusting the model's internal parameters (like weights in neural networks) through backpropagation and optimization algorithms, such as stochastic gradient descent or other algorithms providing similarly useful results.

In accordance with an embodiment, training module 910 manages overfitting, where a model learns the training data too well, including its noise and outliers, at the expense of its ability to generalize to new data. Techniques such as regularization, dropout (in neural networks), and early stopping are implemented to mitigate this. Additionally, the module employs various techniques for hyperparameter tuning; this involves adjusting model parameters that are not directly learned from the training process, such as learning rate, the number of layers in a neural network, or the number of trees in a random forest.

In an embodiment, training module 910 includes logic to handle different types of data and learning tasks. For instance, it includes different training routines for supervised learning (where the training data comes with labels) and unsupervised learning (without labeled data). In the case of deep learning models, training module 910 also manages the complexities of training neural networks that include initializing network weights, choosing activation functions, and setting up neural network layers.

In an embodiment, evaluation and tuning module 912 incorporates dynamic feedback mechanisms and facilitates continuous model evolution to help ensure the system's relevance and accuracy as the data landscape changes. Evaluation and tuning module 912 conducts a detailed evaluation of a model's performance. This process involves using statistical methods and a variety of performance metrics to analyze the model's predictions against a validation dataset. The validation dataset, distinct from the training set, is instrumental in assessing the model's predictive accuracy and its capacity to generalize beyond the training data. The module's algorithms meticulously dissect the model's output, uncovering biases, variances, and the overall effectiveness of the model in capturing the underlying patterns of the data.

In an embodiment, evaluation and tuning module 912 performs continuous model tuning by using hyperparameter optimization. Evaluation and tuning module 912 performs an exploration of the hyperparameter space using algorithms, such as grid search, random search, or more sophisticated methods like Bayesian optimization. Evaluation and tuning module 912 uses these algorithms to iteratively adjust and refine the model's hyperparameters-settings that govern the model's learning process but are not directly learned from the data-to enhance the model's performance. This tuning process helps to balance the model's complexity with its ability to generalize and attempts to avoid the pitfalls of underfitting or overfitting.

In an embodiment, evaluation and tuning module 912 integrates data feedback and updates the model. Evaluation and tuning module 912 actively collects feedback from the model's real-world applications, an indicator of the model's performance in practical scenarios. Such feedback can come from various sources depending on the nature of the application. For example, in a user-centric application like a recommendation system, feedback might comprise user interactions, preferences, and responses. In other contexts, such as predicting events, it might involve analyzing the model's prediction errors, misclassifications, or other performance metrics in live environments.

In an embodiment, feedback integration logic within evaluation and tuning module 912 integrates this feedback using a process of assimilating new data patterns, user interactions, and error trends into the system's knowledge base. The feedback integration logic uses this information to identify shifts in data trends or emergent patterns that were not present or inadequately represented in the original training dataset. Based on this analysis, the module triggers a retraining or updating cycle for the model. If the feedback suggests minor deviations or incremental changes in data patterns, the feedback integration logic may employ incremental learning strategies, fine-tuning the model with the new data while retaining its previously learned knowledge. In cases where the feedback indicates significant shifts or the emergence of new patterns, a more comprehensive model updating process may be initiated. This process might involve revisiting the model selection process, re-evaluating the suitability of the current model architecture, and/or potentially exploring alternative models or configurations that are more attuned to the new data.

In accordance with an embodiment, throughout this iterative process of feedback integration and model updating, evaluation and tuning module 912 employs version control mechanisms to track changes, modifications, and the evolution of the model, facilitating transparency and allowing for rollback if necessary. This continuous learning and adaptation cycle, driven by real-world data and feedback, helps to endure the model's ongoing effectiveness, relevance, and accuracy.

In an embodiment, inference module 914 transforms data raw data into actionable, precise, and contextually relevant predictions. In addition to processing and applying a trained model to new data, inference module 914 may also include post-processing logic that refines the raw outputs of the model into meaningful insights.

In an embodiment, inference module 914 includes classification logic that takes the probabilistic outputs of the model and converts them into definitive class labels. This process involves an analytical interpretation of the probability distribution for each class. For example, in binary classification, the classification logic may identify the class with a probability above a certain threshold, but classification logic may also consider the relative probability distribution between classes to create a more nuanced and accurate classification.

In an embodiment, inference module 914 transforms the outputs of a trained model into definitive classifications. Inference module 914 employs the underlying model as a tool to generate probabilistic outputs for each potential class. It then engages in an interpretative process to convert these probabilities into concrete class labels.

In an embodiment, when inference module 914 receives the probabilistic outputs from the model, it analyzes these probabilities to determine how they are distributed across some or every potential class. If the highest probability is not significantly greater than the others, inference module 914 may determine that there is ambiguity or interpret this as a lack of confidence displayed by the model.

In an embodiment, inference module 914 uses thresholding techniques for applications where making a definitive decision based on the highest probability might not suffice due to the critical nature of the decision. In such cases, inference module 914 assesses if the highest probability surpasses a certain confidence threshold that is predetermined based on the specific requirements of the application. If the probabilities do not meet this threshold, inference module 914 may flag the result as uncertain or defer the decision to a human expert. Inference module 914 dynamically adjusts the decision thresholds based on the sensitivity and specificity requirements of the application, subject to calibration for balancing the trade-offs between false positives and false negatives.

In accordance with an embodiment, inference module 914 contextualizes the probability distribution against the backdrop of the specific application. This involves a comparative analysis, especially in instances where multiple classes have similar probability scores, to deduce the most plausible classification. In an embodiment, inference module 914 may incorporate additional decision-making rules or contextual information to guide this analysis, ensuring that the classification aligns with the practical and contextual nuances of the application.

In regression models, where the outputs are continuous values, inference module 914 may engage in a detailed scaling process in an embodiment. Outputs, often normalized or standardized during training for optimal model performance, are rescaled back to their original range. This rescaling involves recalibration of the output values using the original data's statistical parameters, such as mean and standard deviation, ensuring that the predictions are meaningful and comparable to the real-world scales they represent.

In an embodiment, inference module 914 incorporates domain-specific adjustments into its post-processing routine. This involves tailoring the model's output to align with specific industry knowledge or contextual information. For example, in financial forecasting, inference module 914 may adjust predictions based on current market trends, economic indicators, or recent significant events, ensuring that the outputs are both statistically accurate and practically relevant.

In an embodiment, inference module 914 includes logic to handle uncertainty and ambiguity in the model's predictions. In cases where inference module 914 outputs a measure of uncertainty, such as in Bayesian inference models, inference module 914 interprets these uncertainty measures by converting probabilistic distributions or confidence intervals into a format that can be easily understood and acted upon. This provides users with both a prediction and an insight into the confidence level of that prediction. In an embodiment, inference module 914 includes mechanisms for involving human oversight or integrating the instance into a feedback loop for subsequent analysis and model refinement.

In an embodiment, inference module 914 formats the final predictions for end-user consumption. Predictions are converted into visualizations, user-friendly reports, or interactive interfaces. In some systems, like recommendation engines, inference module 914 also integrates feedback mechanisms, where user responses to the predictions are used to continually refine and improve the model, creating a dynamic, self-improving system.

B. Example Operations of A Machine Learning System

Figure 10:
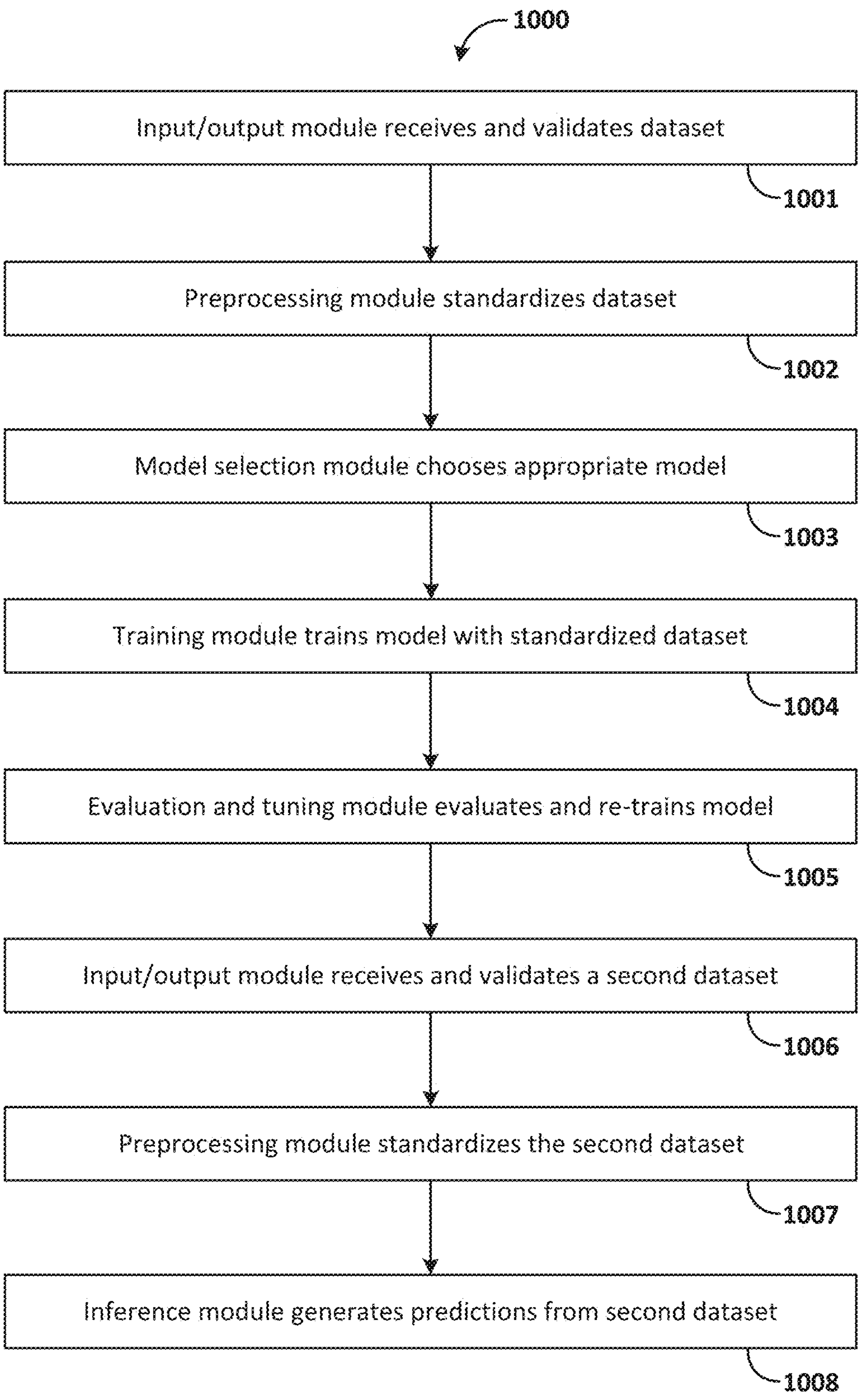
FIG. 10 is a flowchart that depicts example operations of a machine learning system in accordance with one or more embodiments.

FIG. 10 illustrates example operations 1000 of a machine learning system in one or more embodiments. In an embodiment, input/output module 904 receives a dataset intended for training (Operation 1001). This data can originate from diverse sources, like databases or real-time data streams, and in varied formats, such as CSV, JSON, or XML. Input/output module 904 assesses and validates the data, ensuring its integrity by checking for consistency, data ranges, and types.

In an embodiment, training data is passed to data preprocessing module 906. Here, the data undergoes a series of transformations to standardize and clean it, making it suitable for training ML models (Operation 1002). This involves normalizing numerical data, encoding categorical variables, and handling missing values through techniques like imputation.

In an embodiment, prepared data from the data preprocessing module 906 is then fed into model selection module 908 (Operation 1003). This module analyzes the characteristics of the processed data, such as dimensionality and distribution, and selects the most appropriate model architecture for the given dataset and problem. It employs statistical and analytical techniques to match the data with an optimal model, ranging from simpler models for less complex tasks to more advanced architectures for intricate tasks.

In an embodiment, training module 910 trains the selected model with the prepared dataset (Operation 1004). It implements learning algorithms to adjust the model's internal parameters, optimizing them to identify patterns and relationships in the training data. Training module 910 also addresses the challenge of overfitting by implementing techniques, like regularization and early stopping, ensuring the model's generalizability.

In an embodiment, evaluation and tuning module 912 evaluates the trained model's performance using the validation dataset (Operation 1005). Evaluation and tuning module 912 applies various metrics to assess predictive accuracy and generalization capabilities. It then tunes the model by adjusting hyperparameters, and if needed, incorporates feedback from the model's initial deployments, retraining the model with new data patterns identified from the feedback.

In an embodiment, input/output module 904 receives a dataset intended for inference. Input/output module 904 assesses and validates the data (Operation 1006).

In an embodiment, data preprocessing module 906 receives the validated dataset intended for inference (Operation 1007). Data preprocessing module 906 ensures that the data format used in training is replicated for the new inference data, maintaining consistency and accuracy for the model's predictions.

In an embodiment, inference module 914 processes the new data set intended for inference, using the trained and tuned model (Operation 1008). It applies the model to this data, generating raw probabilistic outputs for predictions. Inference module 914 then executes a series of post-processing steps on these outputs, such as converting probabilities to class labels in classification tasks or rescaling values in regression tasks. It contextualizes the outputs as per the application's requirements, handling any uncertainty in predictions and formatting the final outputs for end-user consumption or integration into larger systems.

In an embodiment, the machine learning system 900 includes a machine learning engine API 916. The machine learning engine API 916 allows for applications to leverage machine learning engine 902. In an embodiment, machine learning engine API 916 may be built on a RESTful architecture and offer stateless interactions over standard HTTP/HTTPS protocols. Machine learning engine API 916 may feature a variety of endpoints, each tailored to a specific function within machine learning engine 902. In an embodiment, endpoints such as/submitData facilitate the submission of new data for processing, while/retrieveResults is designed for fetching the outcomes of data analysis or model predictions. The MLE API may also include endpoints like/updateModel for model modifications and/trainModel to initiate training with new datasets.

In an embodiment, machine learning engine API 916 is equipped to support SOAP-based interactions. This extension involves defining a WSDL (Web Services Description Language) document that outlines the API's operations and the structure of request and response messages. In an embodiment, machine learning engine API 916 supports various data formats and communication styles. In an embodiment, machine learning engine API 916 endpoints may handle requests in JSON format or any other suitable format. For example, machine learning engine API 916 may process XML, and it may also be engineered to handle more compact and efficient data formats, such as Protocol Buffers or Avro, for use in bandwidth-limited scenarios.

In an embodiment, machine learning engine API 916 is designed to integrate WebSocket technology for applications necessitating real-time data processing and immediate feedback. This integration enables a continuous, bi-directional communication channel for a dynamic and interactive data exchange between the application and machine learning engine 902.

C. Example Generative Models of A Machine Learning System

A generative model is a machine learning model that is capable of generating new data instances based on the data used to train the model. A generative model may be referred to as a "generative artificial intelligence (AI) model." Generative models learn the underlying distribution of the training data, enabling them to produce new instances of data that share properties with the original dataset. This capability makes them particularly useful in a variety of applications, including image and voice generation, text synthesis, and more sophisticated tasks like unsupervised learning, semi-supervised learning, and domain adaptation.

One type of generative model is a large language model. Large language models are designed to understand, generate, and interpret human language by processing extensive collections of data. The foundational architecture behind large language models is the transformer network, a type of neural network that excels in handling sequential data such as text. Unlike architectures, such as recurrent neural networks (RNNs) or long short-term memory networks (LSTMs), transformers do not process data in order. Instead, they leverage parallel processing to analyze entire text sequences simultaneously, significantly improving efficiency and reducing training times.

In an embodiment, a mechanism that enables transformers to handle complex language tasks is self-attention. This mechanism allows the model to weigh the importance of different words within a sentence or sequence regardless of their position. For instance, in processing the phrase "The cat sat on the mat," the model can directly associate "cat" with "mat" without having to process the intermediate words sequentially. This ability to understand the context and relationships between words in a sentence is what makes transformer networks adept at language tasks. The self-attention mechanism assigns scores to relationships between words, highlighting the most relevant connections, so the model can focus on the most informative parts of the text.

In accordance with one or more embodiments, transformers are composed of multiple layers containing a multi-head, self-attention mechanism and a position-wise, feed-forward network. Within the architecture of transformer models, the multi-head, self-attention mechanism and position-wise, feed-forward network function in concert to process input data. The multi-head, self-attention mechanism is designed to enable parallel processing of input sequences, allowing the model to simultaneously evaluate the importance of different segments of the input relative to each other. This mechanism operates by generating multiple sets of query, key, and value vectors for each element in the input sequence through linear transformation. The relevance of each element to every other element is calculated using a scaled dot-product attention function that computes the attention scores by taking the dot product of the query vector with the key vectors, dividing each by the square root of the dimension of the key vectors to scale the scores, then applying a softmax function to obtain the weights for the value vectors. The scaled dot-product attention function is applied independently by each head in the multi-head self-attention mechanism. The outputs of these heads are then concatenated and linearly transformed, allowing the model to capture information from different representation subspaces.

In accordance with one or more embodiments, following the multi-head, self-attention mechanism is the position-wise, feed-forward network. This component comprises two linear transformations with a non-linear activation function in between. Each element of the input sequence, now enriched with context by the self-attention mechanism, is processed independently through the same feed-forward network. The first linear transformation increases the dimensionality of the input, allowing for a richer representation space. The non-linear activation function introduces the capability to capture non-linear relationships within the data. The second linear transformation then reduces the dimensionality back to that of the model's hidden layers, preparing the output for either further processing by subsequent layers or final output generation. This sequence of operations is applied to each position in the sequence, so the model can learn complex patterns across different parts of the input data without relying on the sequential processing inherent to previous architectures, such as RNNs or LSTMs.

In accordance with one or more embodiments, integrating these components within the transformer architecture facilitates the model's ability to understand and generate human language by leveraging both the global context provided by the self-attention mechanism and the local, position-specific transformations applied by the feed-forward networks. Through the repetitive stacking of layers, transformers achieve a depth of representation that allows for the processing of linguistic information across varying levels of complexity.

In accordance with one or more embodiments, input/output module 904, when used for large language models, handles textual data, converting input text into a format that the model can process. This typically involves tokenization, where the text is broken down into manageable pieces, such as words or subwords, and then converted into numerical representations. These representations, or embeddings, capture semantic information about the text that is then fed into the model for processing. The output from the model is converted from numerical form back into human-readable text, following the generation of predictions or responses.

In accordance with one or more embodiments, data preprocessing module 906 in the context of large language models may include steps such as normalization, where the text is converted to a uniform case and punctuation is standardized. This process ensures that the model treats similar words or symbols consistently, reducing the complexity of the input space. Additionally, techniques such as sentence segmentation may be applied to manage longer texts, enabling the model to process information in chunks that align with natural language structures.

In accordance with one or more embodiments, model selection module 908, when used for large language models involves choosing a specific architecture and configuration that is best suited to the task at hand. This decision is based on various factors, such as the size of the available training data, the complexity of the language tasks to be performed, and computational resource constraints. Models may vary in size from millions to billions of parameters, with larger models generally capable of more nuanced language understanding and generation but requiring significantly more computational power to train and operate.

In accordance with one or more embodiments, training module 910, when used for large language models, is configured to adjust the model's parameters through exposure to training data. This process utilizes optimization algorithms, such as stochastic gradient descent, to minimize the difference between the model's predictions and the actual desired outputs. The training process is computationally intensive, often requiring specialized hardware such as GPUs (Graphics Processing Units) or TPUs (Tensor Processing Units) to manage the large volumes of data and the complexity of the model calculations. During training, techniques, such as dropout and layer normalization, are used to improve model generalization and prevent overfitting (i.e., when a model learns the detail and noise in the training data to the extent that it negatively impacts the model's performance on new data).

In accordance with one or more embodiments, evaluation and tuning module 912 assesses the performance of large language models using metrics such as perplexity, accuracy, and F1 score, depending on the specific language tasks. Evaluation may involve comparing the model's output against a set of labeled validation data, providing insight into how well the model has learned to perform tasks, such as text classification, question answering, or text generation. Tuning involves adjusting model parameters or training strategies based on evaluation outcomes to improve performance. This may include hyperparameter tuning, where parameters that govern the training process, such as learning rate or batch size, are adjusted.

In accordance with one or more embodiments, inference module 914, in the context of large language models, is responsible for generating predictions or responses based on new, unseen data. This process involves feeding the input data through the trained model to produce an output. Inference can be used for a variety of applications, including translating text, generating human-like responses in a chatbot, or summarizing articles.

Another type of generative model is a large multimodal model (LMM). A large multimodal model is an advanced machine learning model capable of processing and generating data across multiple modalities, such as text, images, audio, and video. These models integrate diverse datasets during training to learn the underlying distribution of different data types, enabling them to produce outputs that reflect a comprehensive understanding of the input data. These models can be used for applications such as image captioning, text-to-image generation, image-to-text generation, visual question answering, and more, where understanding the relationship between different data types is crucial. By leveraging diverse datasets during training, large multimodal models learn to create coherent and contextually relevant outputs across various modalities, enhancing their utility in complex, real-world scenarios.

The architecture of large multimodal models combines elements from different neural network designs to handle diverse data types effectively. For example, convolutional neural networks (CNNs) are often used for processing visual data, while transformer networks handle textual data, enabling the model to extract and synthesize features from both images and text. This integration results in outputs that accurately represent the input data, reflecting a deep understanding of both modalities. The transformer architecture, known for its ability to manage sequential data, is frequently adapted to work alongside CNNs, allowing these models to benefit from the strengths of each neural network type.

In at least some instances, the self-attention mechanism, a cornerstone of transformer networks, is integral to the functioning of large multimodal models. It enables the model to weigh the importance of different elements within an input sequence, regardless of their position, allowing it to capture intricate relationships between various data types. For example, in an image captioning task, the model can associate specific visual features with corresponding descriptive text, enhancing the coherence and accuracy of the generated captions. By assigning scores to relationships between elements, the self-attention mechanism highlights the most relevant connections, enabling the model to focus on the most informative parts of the input data and perform complex multimodal tasks effectively.

In large multimodal models, data preprocessing is a step that ensures the input data is in a suitable format for the model to process. This involves tasks such as tokenization for text data, where the text is broken down into manageable pieces, and feature extraction for image data, where key visual elements are identified and encoded. By standardizing and normalizing different data types, preprocessing reduces the complexity of the input space, enabling the model to treat similar elements consistently. Effective preprocessing is essential for the model to integrate information from various modalities and produce accurate, meaningful outputs.

Training large multimodal models involves optimizing their parameters through exposure to diverse datasets that include paired data from different modalities. This computationally intensive process often requires specialized hardware like GPUs or TPUs to manage the large volumes of data and the complexity of the model calculations. Techniques such as dropout and layer normalization are employed to improve model generalization and prevent overfitting. By iteratively adjusting the model's parameters, the training process enables the model to learn underlying patterns and relationships within the data, enhancing its ability to generate coherent and contextually relevant outputs across different modalities.

Evaluation and tuning of large multimodal models are conducted using various metrics tailored to the specific tasks they are designed to perform. For example, BLEU scores are used for text generation tasks, while accuracy is commonly applied for visual recognition tasks to assess performance. Tuning involves adjusting hyperparameters and refining training strategies based on evaluation results to enhance the model's effectiveness. This iterative process ensures that the model can perform a wide range of multimodal tasks with high accuracy and relevance, making it a versatile tool for applications requiring the integration of different types of data.

Large multimodal models represent a significant advancement in machine learning by leveraging sophisticated architectures that combine different neural network types and apply self-attention mechanisms. This enables them to perform complex tasks that require understanding and synthesizing information from diverse data types. Effective preprocessing, rigorous training, and thorough evaluation are crucial to their success, allowing these models to generate coherent and contextually relevant outputs across a wide range of applications.

In accordance with one or more embodiments, other types of models besides large language models and large multimodal models belong to the broad category of generative models. For example, stochastic models directly incorporate randomness into their structure, making them inherently generative as they can produce a diverse set of outputs for a given input. Generative Adversarial Networks (GANs) learn to generate new data that is indistinguishable from the data they were trained on, using a dual-network architecture that involves a generative component. Variational Autoencoders (VAEs) are explicitly designed for generating new data points by learning a distribution of the input data and encode inputs into a latent space and generate outputs by sampling from this space, making them inherently generative. Sequence-to-sequence models are generative in nature when used with sampling strategies. Although this list of generative model types is not exhaustive, it illustrates the broad use of the term generative model beyond large language models.

Although generative models can be leveraged for classification tasks, they inherently operate on principles of randomness, leading to a spectrum of possible outcomes in response to identical inputs. Unlike deterministic models that yield a consistent result whenever the same input is given, generative models use the randomness in the data they are trained on to both mimic and diversify from the training data. This diversity makes generative models ideal for generating new and varied data points as well as for tasks that require creativity and novelty. However, a reliance on randomness creates a trade-off between predictability and flexibility for generative models, potentially making them less predictable in scenarios where uniform outcomes may be expected such as classification tasks.

7. Miscellaneous; Extensions

Embodiments are directed to a system with one or more devices that include a hardware processor and that are configured to perform any of the operations described herein and/or recited in any of the claims below. Embodiments are directed to a system that includes means to perform any of the operations described herein and/or recited in any of the claims below. In an embodiment, a non-transitory, computer-readable storage medium comprises instructions that, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. Accordingly, the specification and drawings are to be regarded in an illustrative rather than a restrictive sense. The sole and exclusive indicator of the scope of patent protection, and what is intended by the applicants to be the scope of patent protection, is the literal and equivalent scope of the set of claims that issue from this application in the specific form that such claims issue, including any subsequent correction.

References, including publications, patent applications, and patents, cited herein are hereby incorporated by reference to the same extent as if the references were individually and specifically indicated to be incorporated by reference and were set forth in entirety herein.

What is claimed is:

1. A method, comprising:

executing a replication process comprising replicating source data from a source dataset stored in a source data repository to a destination data repository comprising a destination dataset, wherein replicating the source data comprises transmitting data messages, comprising the source data, over a replication stream between a source entity associated with the source data repository and a destination entity associated with the destination data repository;

executing a first sampling process comprising obtaining a first source data sample from the source dataset, the first source data sample corresponding to source data previously transmitted to the destination entity for replication of at least a portion of the source dataset;

generating a first control message comprising the first source data sample obtained via the first sampling process;

inserting the first control message between two or more data messages being transmitted over the replication stream;

transmitting the first control message to the destination entity over the replication stream contemporaneously with the two or more data messages, wherein the first control message signals a consistency verification process to be executed by the destination entity during the replication process;

wherein the destination entity receives the first control message over the replication stream contemporaneously with the two or more data messages and responsive to receiving the first control message, the destination entity extracts the first source data sample from the first control message and executes a first verification process comprising comparing the first source data sample to at least a first portion of the destination dataset to verify consistency between the first source data sample and at least the first portion of the destination dataset;

wherein the destination entity classifies the source dataset and the destination dataset as consistent based at least in part on verifying consistency between the first source data sample and at least the first portion of the destination dataset;

wherein the method is performed by at least one device including a hardware processor.

2. The method of claim 1, further comprising:

receiving from the destination entity, a second control message comprising an indication that the destination entity has verified consistency between the first source data sample and at least the first portion of the destination dataset;

classifying the source dataset and the destination dataset as consistent based at least in part on the second control message.

3. The method of claim 1, wherein the first source data sample comprises one or more sample source records and wherein the first control message comprises an instruction to compare the one or more sample source records to at least the first portion of the destination dataset.

4. The method of claim 3, wherein, based on the first control message, the destination entity executes a second sampling process comprising obtaining a destination data sample from the destination dataset, the destination data sample corresponding to source data previously received from a source entity for replication of at least the portion of the source dataset.

5. The method of claim 1, further comprising:

executing a second sampling process comprising obtaining a second source data sample from the source dataset;

generating a second control message comprising the second source data sample;

transmitting the second control message to the destination entity;

wherein the destination entity receives the second control message and responsive to receiving the second control message, the destination entity executes a second verification process comprising comparing the second source data sample of the second control message to at least a second portion of the destination dataset;

wherein the destination entity classifies the source dataset and the destination dataset as inconsistent based at least in part on comparing the second source data sample of the second control message to at least the second portion of the destination dataset.

6. The method of claim 5, further comprising:

receiving from the destination entity, a third control message comprising an indication that the destination entity has determined an inconsistency between the second source data sample and at least the second portion of the destination dataset;

classifying the source dataset and the destination dataset as inconsistent based at least in part on the third control message.

7. The method of claim 6, wherein the inconsistency comprises at least one of:

a first destination record missing from the destination dataset, or a first sample source record of the first source data sample differing from a second destination record of the destination dataset that correspond to the first sample source records record.

8. The method of claim 1, further comprising:

receiving, from the destination entity, a second control message comprising a first destination data sample, the first destination data sample comprising one or more sample destination records from the destination dataset;

responsive to receiving the second control message, executing a second verification process comprising comparing the first destination data sample of the second control message to at least a first portion of the source dataset to verify consistency between the first destination data sample and at least the first portion of the source dataset;

classifying the source dataset and the destination dataset as consistent based at least in part on verifying consistency between the first destination data sample and at least the first portion of the source dataset.

9. The method of claim 8, wherein the destination entity executes a second sampling process comprising obtaining the first destination data sample from the destination dataset, and wherein the destination entity generates the second control message and transmits the second control message to a source entity.

10. The method of claim 8, further comprising:

receiving, from the destination entity, a third control message comprising a third destination data sample;

responsive to receiving the third control message, executing a third verification process comprising comparing the third destination data sample of the third control message to at least a second portion of the source dataset;

classifying the source dataset and the destination dataset as having an inconsistency based at least in part on comparing the third destination data sample of the third control message to at least the second portion of the source dataset.

11. The method of claim 10, wherein the inconsistency comprises at least one of:

a first source record missing from the source dataset, or a first sample destination record of the third destination data sample differing from a second source record of the source dataset that correspond to the first sample destination record.

12. The method of claim 1, wherein the destination dataset comprises a snapshot dataset representing a snapshot of the source dataset, wherein the snapshot is periodically updated based on the source dataset.

13. The method of claim 1, wherein the source dataset comprises a snapshot dataset representing a snapshot of a computing environment, wherein the destination dataset is periodically updated based on the snapshot dataset.

14. The method of claim 1, further comprising:
executing a bootstrapping process for a computing environment, the bootstrapping process comprising:
replicating a first portion of the source data from a snapshot dataset representing a snapshot of the source dataset to the destination dataset;
subsequent to replicating the first portion of the source data, determining an inconsistency between the snapshot of the source dataset and the source dataset;
responsive to determining the inconsistency, replicating a second portion of the source data from the source dataset to the destination dataset;
subsequent to replicating the second portion of the source data, verifying consistency between the source dataset and the destination dataset, wherein the source dataset and the destination dataset are consistent with one another based at least in part on replicating the second portion of the source data;
responsive to verifying consistency between the source dataset and the destination dataset, setting the destination dataset to an active state for use in the computing environment.

15. The method of claim 1, further comprising:
determining a set of attributes of the replication process;
utilizing a machine learning model to configure a sampling protocol based on the set of attributes of the replication process;
executing the first sampling process in accordance with the sampling protocol;
wherein the set of attributes of the replication process comprises at least one of:
(a) detected events that occurred during one or more current or previous instances of executing the replication process;
(b) an application or system associated with the source dataset and/or the destination dataset;
(c) a type or category of the replication process;
(d) a type or category of data being replicated.

16. The method of claim 1, further comprising:
executing the first sampling process in accordance with a sampling protocol, wherein the sampling protocol comprises a sampling rate for verifying consistency between the first source data sample and at least the first portion of the destination dataset that gives statistical assurance to specified confidence level of detecting data drift, relative to the source data, that meets a data drift threshold.

17. The method of claim 16, further comprising:
determining, based on verifying consistency between the first source data sample and at least the first portion of the destination dataset, an absence of data drift between the source dataset and the destination dataset, wherein the absence of data drift comprises at least one of: an absence of volume drift, or an absence of time drift.

18. The method of claim 1, wherein the first control message comprises a data message, the data message comprising the first source data sample and a tag, wherein the destination entity determines, based on the tag, to execute the consistency verification process using the first source data sample.

19. One or more non-transitory computer-readable media comprising instructions that, when executed by one or more hardware processors, cause performance of operations comprising:
executing a replication process comprising replicating source data from a source dataset stored in a source data repository to a destination data repository comprising a destination dataset, wherein replicating the source data comprises transmitting data messages, comprising the source data, over a replication stream between a source entity associated with the source data repository and a destination entity associated with the destination data repository;
executing a first sampling process comprising obtaining a first source data sample from the source dataset, the first source data sample corresponding to source data previously transmitted to the destination entity for replication of at least a portion of the source dataset;
generating a first control message comprising the first source data sample obtained via the first sampling process;
inserting the first control message between two or more data messages being transmitted over the replication stream;
transmitting the first control message to the destination entity over the replication stream contemporaneously with the two or more data messages, wherein the first control message signals a consistency verification process to be executed by the destination entity during the replication process;
wherein the destination entity receives the first control message over the replication stream contemporaneously with the two or more data messages and responsive to receiving the first control message, the destination entity extracts the first source data sample from the first control message and executes a first verification process comprising comparing the first source data sample to at least a first portion of the destination dataset to verify consistency between the first source data sample and at least the first portion of the destination dataset;
wherein the destination entity classifies the source dataset and the destination dataset as consistent based at least in part on verifying consistency between the first source data sample and at least the first portion of the destination dataset.

20. A system comprising:
at least one device including a hardware processor;
the system being configured to perform operations comprising:
executing a replication process comprising replicating source data from a source dataset stored in a source data repository to a destination data repository comprising a destination dataset, wherein replicating the source data comprises transmitting data messages, comprising the source data, over a replication stream between a source entity associated with the source data repository and a destination entity associated with the destination data repository;
executing a first sampling process comprising obtaining a first source data sample from the source dataset, the first source data sample corresponding to source data previously transmitted to the destination entity for replication of at least a portion of the source dataset;

generating a first control message comprising the first source data sample obtained via the first sampling process;

inserting the first control message between two or more data messages being transmitted over the replication stream;

transmitting the first control message to the destination entity over the replication stream contemporaneously with the two or more data messages, wherein the first control message signals a consistency verification process to be executed by the destination entity during the replication process;

wherein the destination entity receives the first control message over the replication stream contemporaneously with the two or more data messages and responsive to receiving the first control message, the destination entity extracts the first source data sample from the first control message and executes a first verification process comprising comparing the first source data sample to at least a first portion of the destination dataset to verify consistency between the first source data sample and at least the first portion of the destination dataset;

wherein the destination entity classifies the source dataset and the destination dataset as consistent based at least in part on verifying consistency between the first source data sample and at least the first portion of the destination dataset.

* * * * *